United States Patent
Vicinus et al.

(10) Patent No.: US 9,865,274 B1
(45) Date of Patent: Jan. 9, 2018

(54) AMBISONIC AUDIO SIGNAL PROCESSING FOR BIDIRECTIONAL REAL-TIME COMMUNICATION

(71) Applicant: GetGo, Inc., Fort Lauderdale, FL (US)

(72) Inventors: Patrick Vicinus, Friedrichsdorf (DE); Florian M. Winterstein, Rolling Hills Est, CA (US)

(73) Assignee: GetGo, Inc., Boston, MA (US)

( * ) Notice: Subject to any disclaimer, the term of this patent is extended or adjusted under 35 U.S.C. 154(b) by 0 days.

(21) Appl. No.: 15/388,552

(22) Filed: Dec. 22, 2016

(51) Int. Cl.
| | |
|---|---|
| *H04H 20/47* | (2008.01) |
| *H04H 20/88* | (2008.01) |
| *H04H 40/36* | (2008.01) |
| *G10L 19/20* | (2013.01) |
| *H04R 5/027* | (2006.01) |
| *G10L 19/008* | (2013.01) |

(52) U.S. Cl.
CPC ............ *G10L 19/20* (2013.01); *G10L 19/008* (2013.01); *H04R 5/027* (2013.01); *H04S 2400/01* (2013.01); *H04S 2400/13* (2013.01); *H04S 2400/15* (2013.01); *H04S 2420/11* (2013.01)

(58) Field of Classification Search
CPC .. H04S 2420/11; H04S 2400/01; G10L 19/20; G10L 19/008
USPC ............................................................. 381/2
See application file for complete search history.

(56) References Cited

U.S. PATENT DOCUMENTS

| | | | |
|---|---|---|---|
| 4,042,779 A | 8/1977 | Craven et al. | |
| 5,594,800 A | 1/1997 | Gerzon | |
| 5,636,272 A * | 6/1997 | Rasmusson | H04M 9/08 379/406.09 |
| 5,757,927 A | 5/1998 | Gerzon et al. | |
| 2012/0014527 A1 * | 1/2012 | Furse | H04S 3/00 381/17 |
| 2015/0244869 A1 * | 8/2015 | Cartwright | H04M 3/568 370/260 |
| 2016/0125867 A1 * | 5/2016 | Jarvinen | G10K 11/175 381/73.1 |

OTHER PUBLICATIONS

Gerzon, Michael A. et al, "Ambisonic Decoders for HDTV," An Audio Engineering Society Preprint, AES Convention: 92, Paper No. 3345, Mar. 24-27, 1992, 42 pages.

(Continued)

*Primary Examiner* — Katherine Faley
(74) *Attorney, Agent, or Firm* — BainwoodHuang

(57) ABSTRACT

An input ambisonic audio signal includes multiple channels, each of which is made up of audio data representing sound captured by an ambisonic microphone. A remote audio signal made up of audio data representing sound captured by remote meeting equipment is output by a local loudspeaker. Acoustic echo cancellation is performed on the input ambisonic audio signal by removing the remote audio signal from the input ambisonic audio signal. The acoustic echo cancellation may be performed on ambisonic A-format or B-format encoded audio data, or on an output encoding generated from the B-format encoded audio data. Comfort noise may be generated based on spectral and spatial characteristics of noise in the input audio data, for insertion into the input signal during acoustic echo cancellation. Automatic gain control may be performed across the multiple channels of the input audio signal.

21 Claims, 12 Drawing Sheets

(56) References Cited

OTHER PUBLICATIONS

Gerzon, Michael A., "Periphony: With-Height Sound Reproduction," Journal of the Audio Engineering Society, Munich, Germany, vol. 21, Issue 1, Jan./Feb. 1973, pp. 2-10.

Gerzon, Michael A., "The Design of Precisely Coincident Microphone Arrays for Stereo and Surround Sound," Mathematical Institute, University of Oxford, England, Audio Engineering Society Convention: 50, Mar. 1975, paper No. L-20, pp. 1-5.

Nettingsmeier, Jorn, "General-purpose Ambisonic playback systems for electroacoustic concerts—a practical approach," Proc. of the 2nd International Symposium on Ambisonics and Spherical Acoustics, May 6-7, 2010, Paris, France, 6 pages.

Wiggins, Bruce et al, "The Design and Optimisation of Surround Sound Decoders Using Heuristic Methods," University of Derby, Derby, United Kingdom, Apr. 2003, 8 pages.

\* cited by examiner

AMBISONIC AUDIO SIGNAL PROCESSING FOR BIDIRECTIONAL REAL-TIME COMMUNICATION

TECHNICAL FIELD

The present disclosure relates generally to processing of audio signals for bidirectional real-time communication, and more specifically to techniques for performing signal processing on ambisonic audio to support bidirectional real-time communication that includes three dimensional audio.

BACKGROUND

Web-hosted services currently exist that provide online meetings that enable a user to communicate with other computer users, customers, clients or colleagues via the Internet in real-time. Typical online meeting services are based on Internet technologies, such as TCP/IP connections, and offer data streams of audio and video that may be shared simultaneously, across geographically dispersed locations. Applications for online meetings include real-time events such as meetings, training events, lectures, and/or presentations.

Real-time audio for existing online meeting technologies may be communicated through a telephone call made over standard telephone lines, or using Voice over Internet Protocol (VoIP).

SUMMARY

Unfortunately, previous technologies for providing online meetings have significant shortcomings with regard to the audio that they support. In particular, previous online meeting technology has not captured and reproduced actual three dimensional audio during online meetings, in a way that represents the specific locations of actual sound sources (e.g. meeting participants) from which different sounds originate in a physical meeting environment, and relative to a head position of a remote participant. Since reproducing three dimensional audio captured in a physical meeting environment is a key part of providing a complete virtual reality (VR) experience during an online meeting, this shortcoming of existing online meeting audio is an impediment to providing a virtual reality experience during online meetings.

When three dimensional audio has been provided by previous systems, it has been provided by unidirectional communication platforms. For example, some existing media streaming platforms have provided unidirectional 360-degree streaming video with audio. In addition, audio recordings and movies are available with various types of surround sound. However, actual three dimensional audio has not been captured and reproduced in the context of bidirectional real-time communications, such as online meetings. Moreover, existing systems that provide three dimensional audio for unidirectional communication do not address problems that are specific to bidirectional audio communications, such as the problem of acoustic echo resulting from audio leaking from a speaker back into a microphone, and/or the need to balance playback of multiple audio sources having disparate volume levels, as may result from different audio capture hardware, captured participants and/or acoustic environments.

To address the above described and other shortcomings of previous systems, new techniques are disclosed herein for providing three dimensional audio during a bidirectional real-time communication session, such as an online meeting, using ambisonic audio. As it is generally known, ambisonic audio is a full-sphere surround sound technique providing audio directionality with regard to sound sources in the horizontal plane (left, right, front and back), as well as for sound sources above and below the listener. Ambisonic audio includes an encoding (B-format encoding) that is a speaker-independent representation of a sound field, and that can be decoded to an arbitrary speaker setup. Ambisonic audio is generally described in "Periphony: With-Height Sound Reproduction.", by Michael A. Gerzon, Journal of the Audio Engineering Society, 1973, all disclosures of which are hereby included herein by reference.

In the disclosed techniques, during a bidirectional real-time communication session between local meeting equipment and remote meeting equipment, an input ambisonic audio signal is received. The input ambisonic audio signal includes multiple channels, each of which is made up of audio data representing sound captured by a corresponding one of multiple capsules contained in an ambisonic microphone located in the local meeting equipment. A remote audio signal is also received, made up of audio data representing sound captured by a microphone that is part of the remote meeting equipment. The remote audio signal is passed to at least one local loudspeaker located in the local meeting equipment for output by the local loudspeaker as sound.

In response to receipt of the input ambisonic audio signal and the remote audio signal, an output audio signal is generated by performing acoustic echo cancellation on the input ambisonic audio signal. Performing acoustic echo cancellation on the input ambisonic audio signal is accomplished by removing the remote audio signal from the input ambisonic audio signal.

The output audio signal is transmitted to the remote meeting equipment for playback during the bidirectional real-time communication session through loudspeakers or the like contained in the remote meeting equipment.

Performing acoustic echo cancellation on the input ambisonic audio signal may include introducing automatically generated comfort noise into the input ambisonic audio signal in order to avoid the creation of audible and potentially distracting level fluctuations and/or to mask residual echo introduced during the acoustic echo cancellation process. In the disclosed techniques, introducing comfort noise includes estimating the spectral and spatial characteristics of actual noise in the input ambisonic audio signal, and automatically generating comfort noise to be inserted into the input ambisonic audio signal that matches the spectral and spatial characteristics of the actual noise in the input ambisonic audio signal.

In another aspect of the disclosed techniques, an A-format encoding of the input ambisonic audio signal may be generated, which may be a pulse-code modulation encoding of the audio data contained in each channel of the input ambisonic audio signal. Performing acoustic echo cancellation on the input ambisonic audio signal may include removing the remote audio signal from the A-format encoding of the input ambisonic audio signal.

In another aspect of the disclosed techniques, after the remote audio signal is removed from the A-format encoding of the input ambisonic audio signal, a B-format encoding of the input ambisonic audio signal may be generated from the A-format encoding of the input ambisonic audio signal. As it is generally known, the B-format encoding of the input audio signal is a loudspeaker configuration independent encoding of the input ambisonic audio signal. The output audio signal may then be the B-format encoding of the input ambisonic audio signal, and transmitting the output audio signal to the remote meeting equipment may include transmitting the B-format encoding of the input ambisonic audio signal to the remote meeting equipment.

In another aspect of the disclosed techniques, an output encoding of the input ambisonic audio signal may be generated from the B-format encoding of the input ambisonic audio signal. The output encoding may, for example, be a stereo encoding, but other types of output encodings may be used in the alternative. The output audio signal may then be the output encoding of the input ambisonic audio signal, and transmitting the output audio signal to the remote meeting equipment may include transmitting the output encoding of the input ambisonic audio signal to the remote meeting equipment.

In another aspect of the disclosed techniques, performing acoustic echo cancellation on the input ambisonic audio signal may be performed by removing the remote audio signal from the B-format encoding of the input ambisonic audio signal. The output audio signal may then be the B-format encoding of the input ambisonic audio signal, and transmitting the output audio signal to the remote meeting equipment may include transmitting the B-format encoding of the input ambisonic audio signal to the remote meeting equipment. Alternatively, after removing the remote audio signal from the B-format encoding of the input ambisonic audio signal, an output encoding (e.g. a stereo format encoding) of the input ambisonic audio signal may be generated from the B-format encoding of the input ambisonic audio signal, the output audio signal may be the output encoding of the input ambisonic audio signal, and transmitting the output audio signal to the remote meeting equipment may include transmitting the output encoding of the input ambisonic audio signal to the remote meeting equipment.

In another aspect of the disclosed techniques, performing acoustic echo cancellation on the input ambisonic audio signal may include removing the remote audio signal from the output encoding of the input ambisonic audio signal after generating the output encoding of the input ambisonic audio signal from the B-format encoding of the input ambisonic audio signal.

In another aspect of the disclosed techniques, automatic gain control may be performed on the input ambisonic audio signal by i) monitoring a maximum energy detected on each one of the channels in the input ambisonic audio signal, ii) deriving an adaptive gain based on the maximum energy detected on each one of the channels in the input ambisonic audio signal, and iii) applying the adaptive gain to each one of the channels in the input ambisonic audio signal.

The disclosed techniques may be embodied to provide various advantages over previous systems. For example, by performing acoustic echo cancellation on an input ambisonic audio signal, the disclosed techniques enable the use of ambisonic sound in bidirectional real-time communication sessions, such as online meetings. The disclosed techniques for acoustic echo cancellation address the problem of acoustic echo resulting from audio leaking from a speaker back into an ambisonic microphone. By generating comfort noise with the same spatial and spectral characteristics of noise contained in the input ambisonic audio signal, the disclosed techniques avoid problems that may arise with regard to comfort noise not matching the characteristics of the actual noise it replaces in the input ambisonic audio signal. The disclosed techniques for automatic gain control address the problem of disparate source volume levels resulting from different audio capture hardware, captured participants and/ or acoustic environments when using ambisonic sound. As a result, using the disclosed techniques, audio played back through remote meeting equipment may provide an effective three dimensional audio experience of an online meeting. Since three dimensional audio experience is a key component of providing support for a realistic virtual reality experience, the disclosed techniques enable a meeting participant to effectively participate in an online meeting using meeting equipment such as a virtual reality or augmented reality headset.

BRIEF DESCRIPTION OF THE DRAWINGS

The foregoing and other objects, features and advantages will be apparent from the following description of particular embodiments of the present disclosure, as illustrated in the accompanying drawings in which like reference characters refer to the same parts throughout the different views. The drawings are not necessarily to scale, emphasis instead being placed upon illustrating the principles of various embodiments of the present disclosure.

DETAILED DESCRIPTION

Embodiments of the invention will now be described with reference to the remaining figures. It should be understood that such embodiments are provided only by way of example and to illustrate various features and principles of the invention, and that the invention itself is broader than the specific examples of embodiments disclosed herein.

The individual features of the particular embodiments, examples, and implementations disclosed below can be combined in any desired manner that makes technological sense. Moreover, such features are hereby combined to form all possible combinations, permutations and variants except to the extent that such combinations, permutations and/or variants have been explicitly excluded or are impractical. Support for such combinations, permutations and variants is considered to exist in this document.

Figure 1:
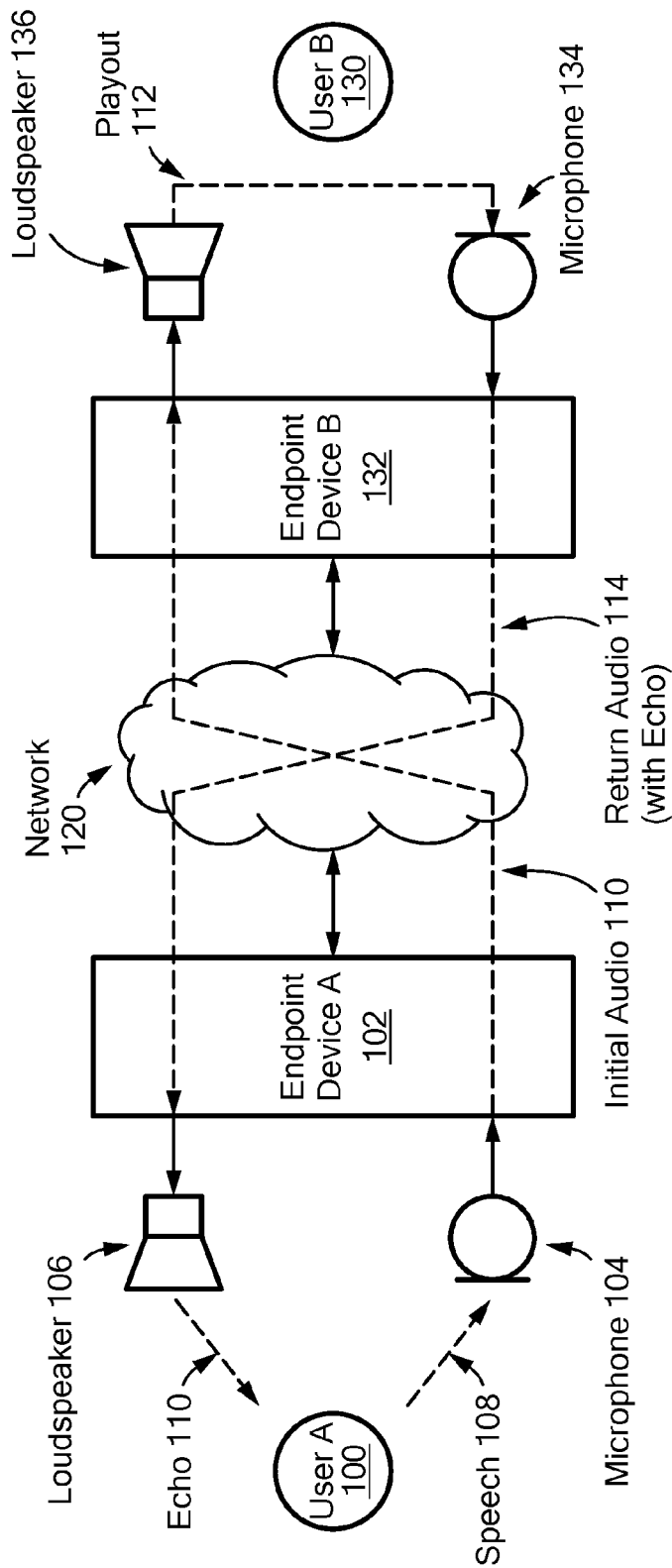
FIG. 1 is a block diagram illustrating the problem of echo occurring during a real-time audio communication.

FIG. 1 is a block diagram illustrating the problem of echo occurring during a real-time audio communication in which no acoustic echo cancellation is performed. As shown in FIG. 1, Endpoint Device A 102 and Endpoint Device B 132 are connected for a real-time audio communication session via Network 120. Endpoint devices such as Endpoint Device A 102 and Endpoint Device B 132 may each consist of or include any specific type of device that is operable to provide a real-time audio communication session. A real-time audio communication session may consist of or include any specific type of real-time communication between multiple geographically distributed users that includes audio communication, such as a telephone call, Web conference, online meeting, etc.

In the example of FIG. 1 Endpoint Device A 102 and Endpoint Device B 132 are each equipped with at least one microphone and at least one loudspeaker, shown by Microphone 104 and Loudspeaker 106 for Endpoint Device A 102, and by Microphone 134 and Loudspeaker 136 for Endpoint Device B 132. Each microphone picks up the audio to be transmitted to the other endpoint device, and each loudspeaker plays out the audio sent from the other endpoint device. Accordingly, when User A 100 speaks, Microphone 104 picks up the resulting Speech 108 as audio, which is transmitted as Initial Audio 110 to Endpoint Device B 132. At Endpoint Device B 132 Initial Audio 110 is played out of Loudspeaker 136 as sound, shown by Playout 112. Microphone 134 at Endpoint Device B 132 captures Playout 112, which is then transmitted back to Endpoint Device A 102 as Return Audio 114, and played out of Loudspeaker 106 as Echo 110. As a result of Echo 110, User A 100 will hear him or herself speaking. Echo degrades the user experience during a real-time audio communication session, and may even make it impossible for users to have a real-time conversation.

Figure 2:
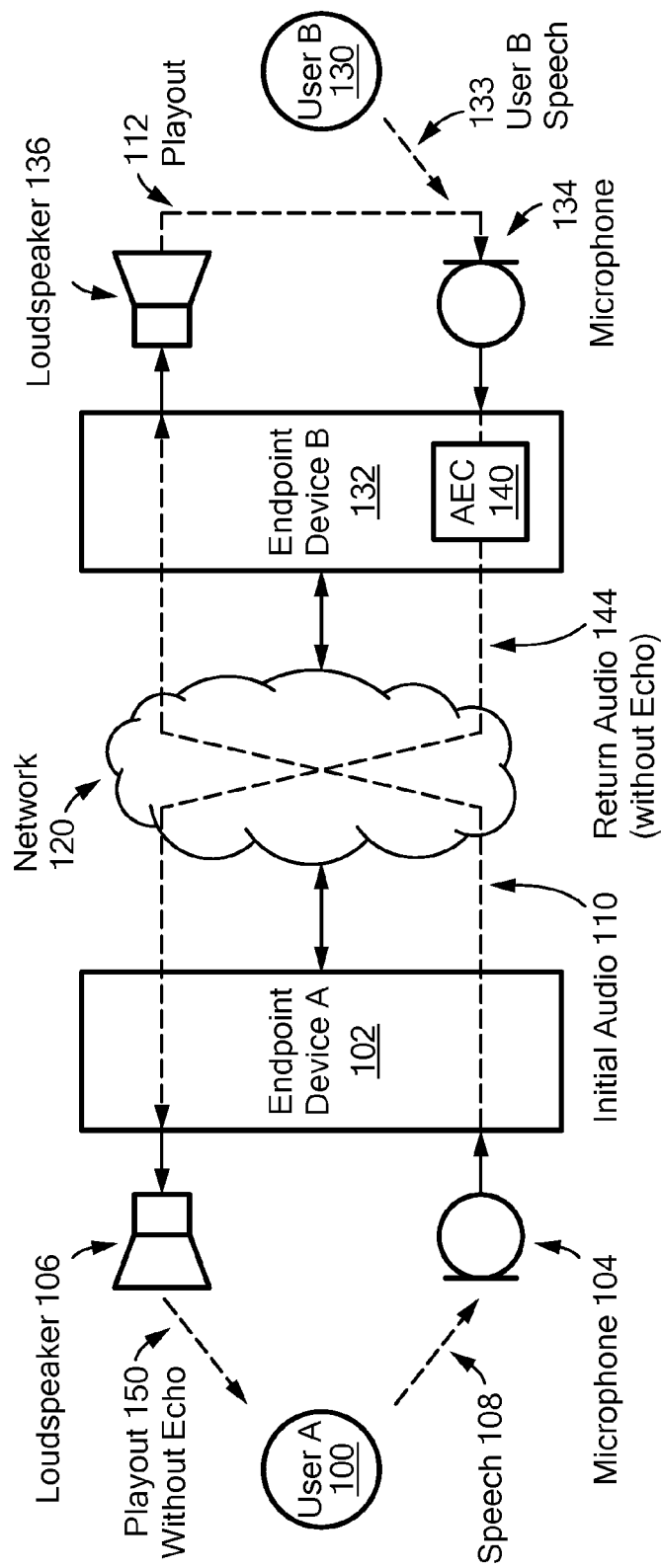
FIG. 2 is a block diagram illustrating the use of a conventional acoustic echo cancelling component to remove echo from a real-time audio communication.

FIG. 2 is a block diagram illustrating the use of a conventional acoustic echo canceller to remove echo from a real-time audio communication session. In FIG. 2, Endpoint Device B 132 has been equipped with an acoustic echo cancelling component, shown by AEC 140. AEC 140 processes the audio signal it receives from Microphone 134 prior to transmission of Return Audio 144 from Endpoint Device B 132. As shown in FIG. 2, the audio signal output from Microphone 134 may consist of both the desired speech from User B 130, shown by User B Speech 133, as well as the sound played out by Loudspeaker 136, shown by Playout 112. AEC 140 operates by removing Playout 112 from the combined audio signal received from the Microphone 134, leaving only User B Speech 133 for transmission to Endpoint Device A 102 in Return Audio 144. When AEC 140 is operating correctly, Return Audio 144 is echo-free, resulting in Playout 150 from Loudspeaker 106 having no echo.

Figure 3:
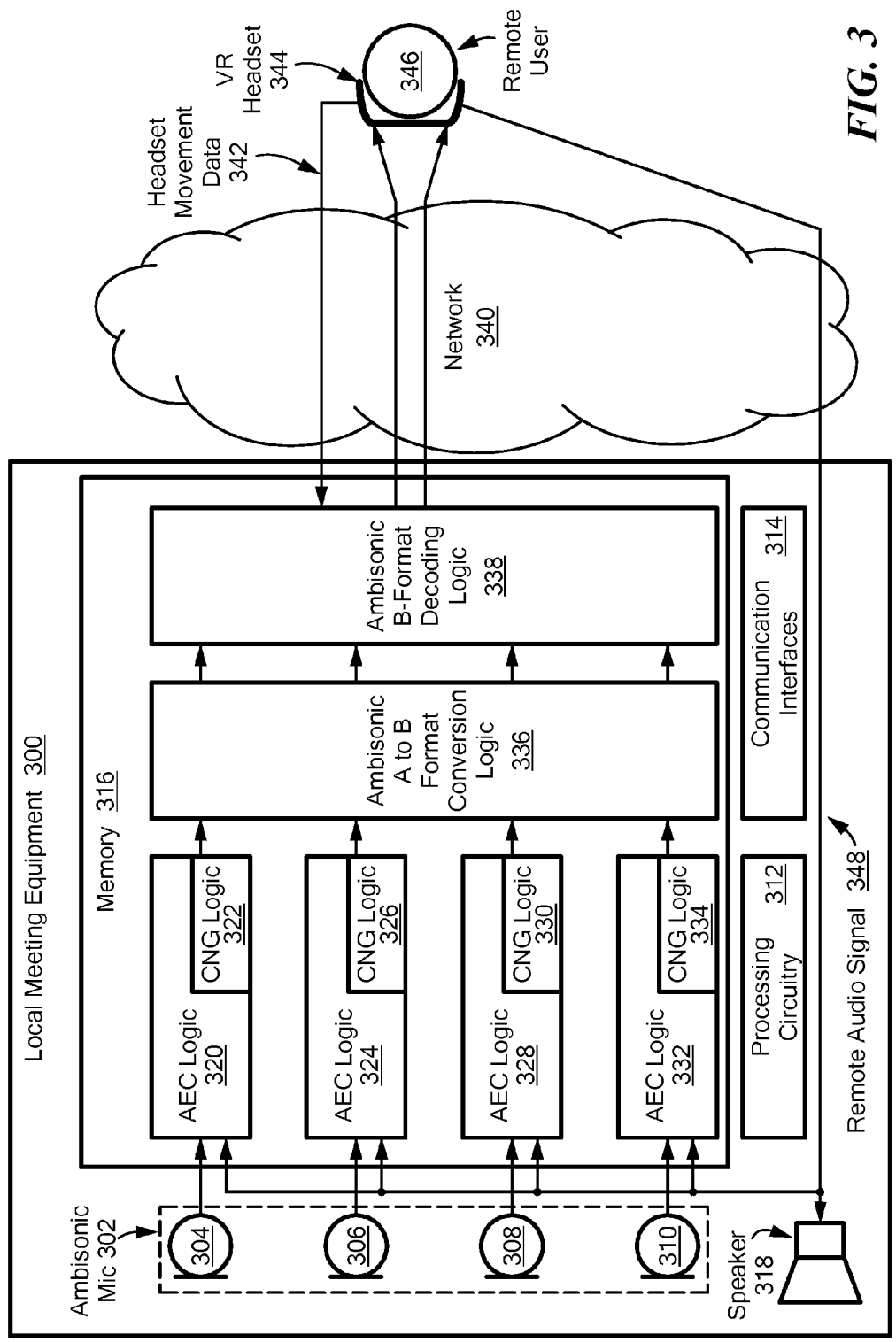
FIG. 3 is a block diagram showing an illustrative embodiment in which acoustic echo cancellation is performed on an input ambisonic audio signal to remove a remote audio signal from the input ambisonic audio signal.

FIG. 3 is a block diagram showing an illustrative embodiment of the disclosed techniques in which acoustic echo cancellation is performed on an input ambisonic audio signal to remove a remote audio signal from the input ambisonic audio signal. As shown in FIG. 3, Local Meeting Equipment 300 may include or be communicably connected to an Ambisonic Microphone 302 having multiple capsules, shown for purposes of illustration by capsule 304, capsule 306, capsule 308, and capsule 310. Ambisonic Microphone 302 may be embodied as a first order ambisonic microphone such as a tetrahedral microphone, in which capsules 304, 306, 308 and 310 are either cardioid or sub-cardioid microphones arranged in a tetrahedron. One example of a first order ambisonic microphone is known as a Soundfield microphone. The design of a Soundfield microphone is generally described in "The Design of Precisely Coincident Microphone Arrays for Stereo and Surround Sound", by Michael A. Gerzon, 50th Audio Engineering Society Convention, March 1975, all disclosures of which are hereby included by reference herein. See also U.S. Pat. No. 4,042, 779 of Peter G. Craven and Michael A. Gerzon, entitled "Coincident Microphone Simulation Covering Three Dimensional Space and Yielding Various Directional Outputs", and issued on Aug. 16, 1977, all disclosures of which are also hereby included by reference herein. Alternatively, Ambisonic Microphone 302 may be embodied as a higher order ambisonic microphone, using a larger number of capsules. One example of a higher order ambisonic microphone is the Eigenmike® microphone array, provided by mh acoustics LLC, in which thirty-two microphone elements are positioned on the surface of a rigid sphere.

The output of Ambisonic Microphone 302 is an example of an input ambisonic audio signal that includes multiple channels, and that may be processed using the disclosed techniques. Each channel in the ambisonic audio signal output from Ambisonic Microphone 302 consists of audio data representing sound captured by a corresponding one of the capsules 304, 306, 308, and 310. Accordingly, a first channel in the ambisonic audio signal output from Ambisonic Microphone 302 consists of audio data representing the sound captured by capsule 304, a second channel in the ambisonic audio signal output from Ambisonic Microphone 302 consists of audio data representing the sound captured by capsule 306, a third channel in the ambisonic audio signal output from Ambisonic Microphone 302 consists of audio data representing the sound captured by capsule 308, and a fourth channel in the ambisonic audio signal output from Ambisonic Microphone 302 consists of audio data representing sound captured by capsule 310. The audio data representing sound captured by each respective one of the capsules 304, 306, 308 and 310 may be embodied as Pulse Code Modulation (PCM) encoded audio data. For example, PCM encoded audio data for all the channels of the ambisonic audio signal that is output from Ambisonic Microphone 302 is referred to herein as the A-format encoding of the input ambisonic audio signal that is output from Ambisonic Microphone 302.

As shown in FIG. 3, the ambisonic audio signal that is output from Ambisonic Microphone 302 is an example of input ambisonic audio signal that may be received by multiple independent acoustic echo cancellers, shown in FIG. 3 by AEC Logic 320, AEC Logic 324, AEC Logic 328 and AEC Logic 332. Specifically, a channel consisting of PCM encoded audio data representing sound captured by capsule 304 may be input to AEC Logic 320, a channel consisting of PCM encoded audio data representing sound captured by capsule 306 may be input to AEC Logic 324, a channel consisting of PCM encoded audio data representing sound captured by capsule 308 may be input to AEC Logic 328, and a channel consisting of PCM encoded audio data representing sound captured by capsule 310 may be input to AEC Logic 332.

A Remote Audio Signal 348 is received by Local Meeting Equipment 300, and is passed to a loudspeaker, shown by Speaker 318, for output as sound. The Remote Audio Signal 348 consists of sound captured by remote meeting equipment. For example, Local Meeting Equipment 300 may be located in a local meeting environment, such as a local conference room, and remote meeting equipment may be located in a remote meeting environment, such as a remote conference room. In the example of FIG. 3, an example of remote meeting equipment is shown by a Virtual Reality Headset 344 worn by a Remote User 346 located in a remote meeting environment. The Virtual Reality Headset 344 includes one or more microphones for capturing audio, such as speech audio received from Remote User 346. Remote Audio Signal 348 may, for example, be made up of PCM encoded audio data generated by Virtual Reality Headset 344 from audio captured by a microphone in Virtual Reality Headset 344, and that is transmitted by Virtual Reality Headset 344 over Network 340 to Local Meeting Equipment 300. Remote Audio Signal 348 is received by Communication Interfaces 314, and then passed to both i) Speaker 318 and ii) each one of the acoustic echo cancellers, i.e. to each one of AEC Logic 320, AEC Logic 324, AEC Logic 328, and AEC Logic 332. Communication Interfaces 314 may consist of or include one or more network interfaces that enable the Local Meeting Equipment 300 to communicate over one or more computer networks, including Network 340. Network 340 may consist of or include one or more communication networks, such as a local area network (LAN), and/or a wide area network (WAN) such as the Internet.

In addition to one or more microphones, Virtual Reality Headset 344 may further include various other components that enable Virtual Reality Headset 344 to provide a virtual reality experience to Remote User 346. Virtual Reality Headset 344 may provide a virtual reality experience of an online meeting with other meeting participants located in a different meeting environment than the one in which Remote User 346 is located in. For example, the virtual reality experience provided to Remote User 346 by Virtual Reality Headset 344 may give Remote User 346 the experience of being present in the meeting environment that contains Local Meeting Equipment 300, including a three dimensional experience of audio that originate in the meeting environment that contains Local Meeting Equipment 300. Accordingly, Virtual Reality Headset 344 may further include components such as a virtual reality display that displays video received from Local Meeting Equipment 300 and provides a 360 degree view of the meeting environment containing Local Meeting Equipment 300. Virtual Reality Headset 344 may further include components operable to determine and communicate the orientation and movements of Remote User 346's head. Such components may detect and store data describing the various movements of Virtual Reality Headset 344 (e.g. in terms of yaw, pitch, roll, etc.), which may then be transmitted as Headset Movement Data 342 from Virtual Reality Headset 344 over Network 340 to Ambisonic B-format Decoding Logic 338 in Local Meeting Equipment 300. Ambisonic B-format Decoding Logic 338 responds to Headset Movement Data 342 by decoding a B-format encoding of the input ambisonic audio signal to an output encoding that provides three dimensional audio reflecting the current positional orientation of Virtual Reality Headset 344, and that is transmitted back to Virtual Reality Headset 344 for output as sound through speakers (e.g. headphones) contained in Virtual Reality Headset 344. While in some cases the output encoding generated by Ambisonic B-format Decoding Logic 338 may consist of a stereo formatted encoding, as in the case where it is to be output through stereo headphones in Virtual Reality Headset 344, the disclosed techniques are not limited to generating stereo format output encodings. For example, in the alternative, the output encoding generated by Ambisonic B-format Decoding Logic 338 may be formatted for output by surround sound speaker setups of any specific kind.

Virtual Reality Headset 344 may further include sensors such as a gyroscope, accelerometer and/or magnetometer that operate to detect movement of Virtual Reality Headset 344, and that may be used to generate Headset Movement Data 342. Virtual Reality Headset 344 may include a memory operable to store program code executable on one or more processors contained in Virtual Reality Headset 344, as well as communication interfaces that consist of or include one or more network interfaces that enable Virtual Reality Headset 344 to communicate over one or more computer networks, such as Network 340.

AEC Logic 320, AEC Logic 324, AEC Logic 328 and AEC Logic 332 perform acoustic echo cancellation on the input ambisonic audio signal they receive by removing Remote Audio Signal 348 independently from each channel of the input ambisonic audio signal. For example, AEC Logic 320 removes Remote Audio Signal 348 from the channel consisting of PCM encoded audio data representing sound captured by capsule 304, AEC Logic 324 removes Remote Audio Signal 348 from the channel consisting of PCM encoded audio data representing sound captured by capsule 306, AEC Logic 328 removes Remote Audio Signal 348 from the channel consisting of PCM encoded audio data representing sound captured by capsule 308, and AEC Logic 332 removes Remote Audio Signal 348 from the channel consisting of PCM encoded audio data representing sound captured by capsule 310. In this way, AEC Logic 320, AEC Logic 324, AEC Logic 328 and AEC Logic 332 perform acoustic echo cancellation by removing Remote Audio Signal 348 from an A-format encoding of the input ambisonic audio signal.

One potential side effect of removing Remote Audio Signal 348 from the A-format encoding of the input ambisonic audio signal results from the coincident removal of background noise from the input ambisonic audio signal, such as the noise of an air conditioner, fan, etc., that may be collocated in the local meeting environment with the Local Meeting Equipment 302. Removal of such background noise may result in distracting level fluctuations or periods of silence in the processed input ambisonic audio signal. In order to address this problem, after performing acoustic echo cancellation by removing Remote Audio Signal 348 from the input ambisonic audio signal, AEC Logic 320, AEC Logic 324, AEC Logic 328 and AEC Logic 332 automatically and independently generate comfort noise that is inserted into the input ambisonic audio signal, e.g. in time periods during which there would otherwise be only distracting silence after removal of Remote Audio Signal 348 and the coincident removal of background noise from the input ambisonic audio signal. In the embodiment of FIG. 3, each one of AEC Logic 320, AEC Logic 324, AEC Logic 328 and AEC Logic 332 independently generates comfort noise for the corresponding channel of the input ambisonic audio signal on which they perform acoustic echo cancellation. The comfort noise generated for each channel may be generated to match the energy level and spectral characteristics of the background noise detected in that respective channel of the input ambisonic audio data. Accordingly, AEC Logic 320 includes CNG Logic 322 that generates comfort noise that matches background noise detected in the channel consisting of PCM encoded audio data representing sound captured by capsule 304, AEC Logic 324 includes CNG Logic 326 that generates comfort noise that matches background noise detected in the channel consisting of PCM encoded audio data representing sound captured by capsule 306, AEC Logic 328 includes CNG Logic 330 that generates comfort noise that matches background noise detected in the channel consisting of PCM encoded audio data representing sound captured by capsule 308, and AEC Logic 332 includes CNG Logic 334 that generates comfort noise that matches background noise detected in the channel consisting of PCM encoded audio data representing sound captured by capsule 310. In this way AEC Logic 320, AEC Logic 324, AEC Logic 328 and AEC Logic 332 generate comfort noise that is inserted independently into the separate channels of the processed input ambisonic audio signal, e.g. during time periods in which the echo cancellation process removed both the Remote Audio Signal 348 and background noise from the input ambisonic audio signal, to avoiding distracting level fluctuations and/or time periods of silence in the respective channels of the input ambisonic audio signal.

After processing of the respective channels of the input ambisonic audio signal by AEC Logic 320, AEC Logic 324, AEC Logic 328 and AEC Logic 332 to remove Remote Audio Signal 348 and introduce comfort noise as needed, the resulting version of the input ambisonic audio signal is passed to Ambisonic A to B Format Conversion Logic 336. Ambisonic A to B Format Conversion Logic 336 converts the A-format encoding of the input ambisonic audio signal that it receives from AEC Logic 320, AEC Logic 324, AEC Logic 328 and AEC Logic 332 to an ambisonic B-format encoding of the input ambisonic audio signal. The resulting ambisonic B-format encoding is a speaker-independent representation of the actual sound field within the local meeting environment that contains the Local Meeting Equipment 300. The B-format encoding can be decoded to an arbitrary speaker setup. As it is generally known, the B-format encoding of the input ambisonic audio signal that is output from Ambisonic A to B Format Conversion Logic 336 may include four channels, consisting of W for the sound pressure, X for the front-minus-back sound pressure gradient, Y for left-minus-right, and Z for up-minus-down. The W channel corresponds to an omnidirectional microphone, whereas X, Y and Z are the components that would be picked up by figure-of-eight capsules oriented along the three spatial axes. The conversion from A-format to B-format encoding may be performed by Ambisonic A to B Format Conversion Logic 336 using various specific conversion techniques. An example of such conversion is generally described in the above referenced "The Design of Precisely Coincident Microphone Arrays for Stereo and Surround Sound" and/or the above referenced U.S. Pat. No. 4,042,779. The B-format encoding of the input ambisonic audio signal that is generated by Ambisonic A to B Format Conversion Logic 336 is passed from Ambisonic A to B Format Conversion Logic 336 to Ambisonic B-Format Decoding Logic 338.

Ambisonic B-Format Decoding Logic 338 decodes the B-format encoding based on Headset Movement Data 342, such that an output encoding of the input ambisonic audio signal is generated by Ambisonic B-Format Decoding Logic 338 that reflects the current head position of Remote User 346, in order to support a virtual reality experience of the online meeting by Remote User 346, as provided through the Virtual Reality Headset 344. The decoding performed by Ambisonic B-Format Decoding Logic 338 may be accomplished using various specific B-Format decoding techniques. Examples of such B-format decoding techniques include those described in U.S. Pat. No. 5,757,927 of Michael A. Gerzon and Geoffrey J. Barton, entitled "Surround Sound Apparatus", and issued May 26, 1998, all disclosures of which are hereby included herein by reference. The output encoding of the input ambisonic audio signal that is generated by Ambisonic B-Format Decoding Logic 338 is an example of an output audio signal that may be transmitted from Local Meeting Equipment 300, e.g. using Communication Interfaces 314, across Network 340 to the remote meeting equipment, e.g. to Virtual Reality Headset 344.

As shown in the example of FIG. 3, AEC Logic 320, AEC Logic 324, AEC Logic 328, AEC Logic 332, Ambisonic A to B Format Conversion Logic 336, and Ambisonic B-Format Decoding Logic 338 may all be embodied as program code stored in Memory 316 of Local Meeting Equipment, and may be executable on one or more microprocessors or the like that are communicably coupled to Memory 316, shown by Processing Circuitry 312. However, the disclosed techniques are not limited to such an embodiment, and alternatively one or more of AEC Logic 320, AEC Logic 324, AEC Logic 328, AEC Logic 332, Ambisonic A to B Format Conversion Logic 336, and Ambisonic B-Format Decoding Logic 338 may all be embodied in whole or in part as hardware circuitry. Local Meeting Equipment 300 may itself be embodied in whole or in part as one or more computers, such as one or more laptop, desktop, server, or mobile computers, which may have integrated therein and/or be communicably coupled to the Ambisonic Microphone 302 and Speaker 318 that are also located within a local meeting environment.

Figure 4:
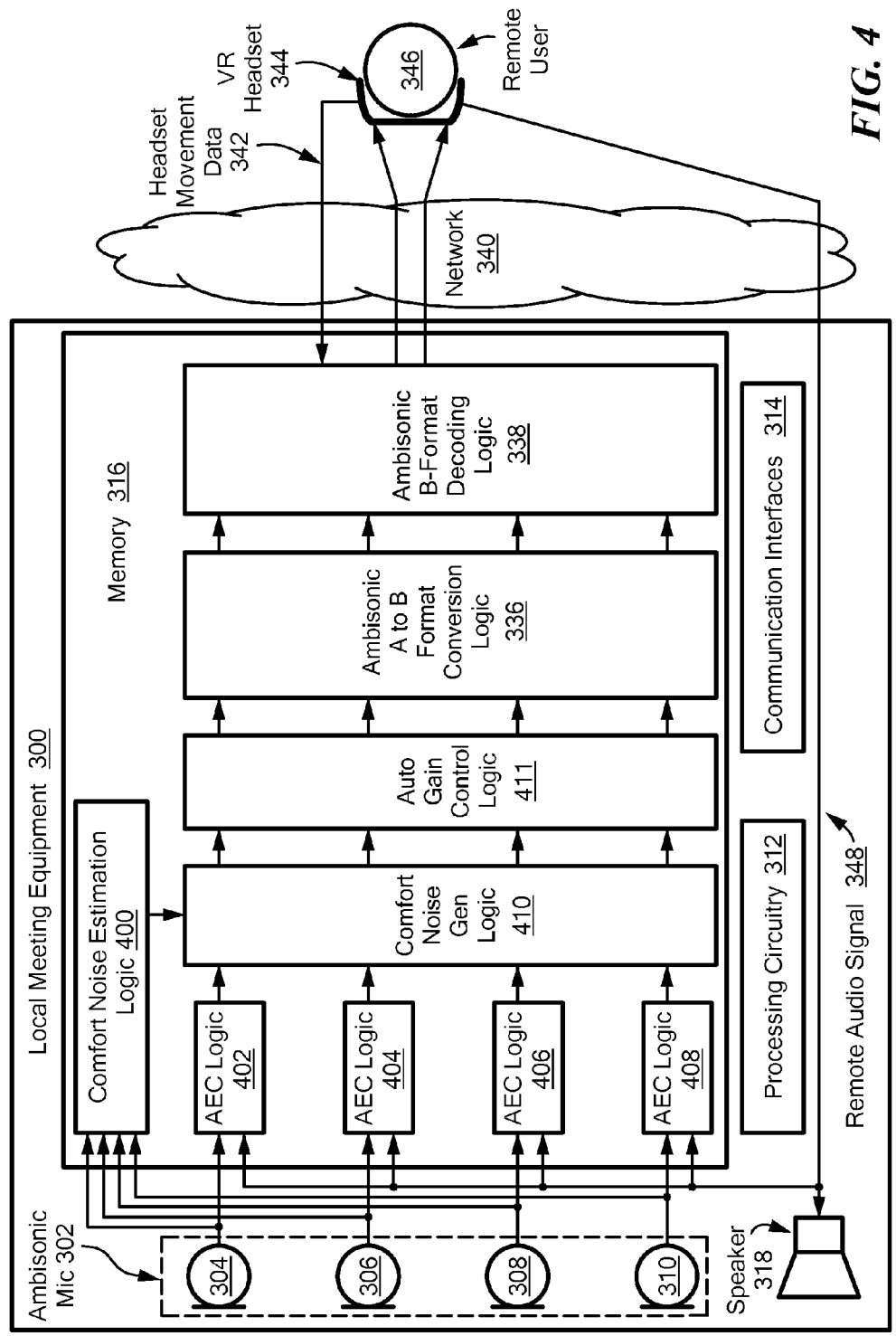
FIG. 4 is a block diagram showing an illustrative embodiment in which the acoustic echo cancellation performed on the input ambisonic audio signal includes inserting automatically generated comfort noise into the input ambisonic audio signal, in which generating the comfort noise includes estimating the spatial and spectral characteristics of actual noise in the input ambisonic audio signal and generating comfort noise that matches the spatial and spectral characteristics of the actual noise in the input ambisonic audio signal, and in which automatic gain control is performed after the acoustic echo cancellation.

FIG. 4 is a block diagram showing an illustrative embodiment in which the acoustic echo cancellation performed on the input ambisonic audio signal includes estimating the spectral and spatial characteristics of actual noise in the input ambisonic audio signal, and automatically generating comfort noise to be inserted into the input ambisonic audio signal that matches the spectral and spatial characteristics of the actual noise in the input ambisonic audio signal. As also shown in FIG. 4, automatic gain control may also be performed after the acoustic echo cancellation. As shown in FIG. 4, AEC Logic 402, AEC Logic 404, AEC Logic 406, and AEC Logic 408 perform acoustic echo cancellation on the input ambisonic audio signal by removing Remote Audio Signal 348 from the A-format encoding of the input ambisonic audio signal. Specifically, AEC Logic 402, AEC Logic 404, AEC Logic 406 and AEC Logic 408 perform acoustic echo cancellation on the input ambisonic audio signal by removing Remote Audio Signal 348 independently from each channel of the input ambisonic audio signal. For example, AEC Logic 402 removes Remote Audio Signal 348 from the channel consisting of PCM encoded audio data representing sound captured by capsule 304, AEC Logic 404 removes Remote Audio Signal 348 from the channel consisting of PCM encoded audio data representing sound captured by capsule 306, AEC Logic 406 removes Remote Audio Signal 348 from the channel consisting of PCM encoded audio data representing sound captured by capsule 308, and AEC Logic 408 removes Remote Audio Signal 348 from the channel consisting of PCM encoded audio data representing sound captured by capsule 310.

In the embodiment of FIG. 4, comfort noise generation is provided by Comfort Noise Estimation Logic 400, which operates to estimate spatial and spectral characteristics of actual noise contained in the input ambisonic audio signal, and Comfort Noise Generation Logic 410, which operates based on the estimation generated by Comfort Noise Estimation Logic 400 to generate comfort noise that matches the spatial and spectral characteristics of the actual noise contained in the input ambisonic audio signal. In other words, Comfort Noise Generation Logic 410 generates comfort noise based on the estimation of the spatial and spectral characteristics of the actual noise contained in the input ambisonic audio signal, as estimated by Comfort Noise Estimation Logic 400.

By generating comfort noise that matches the spatial and spectral characteristics of actual noise contained in the input ambisonic audio signal, the Comfort Noise Estimation Logic 400 and Comfort Noise Generation Logic 410 of FIG. 4 provide advantages over the independent, per-channel generation of comfort performed by the embodiment of shown in FIG. 3. While the comfort noise generated independently per channel, as in the embodiment of FIG. 3, can be effective in masking level fluctuations and/or periods of silence resulting from the acoustic echo cancellation process, it may also introduce spatial fluctuations into the input ambisonic audio signal, resulting in the listener perceiving that the locations of noise sources within the soundfield are varying, effectively eliminating the 3d audio effect. Such potential shortcomings may be effectively addressed through use of the Comfort Noise Estimation Logic 400 and Comfort Noise Generation Logic 410.

The output of Comfort Noise Generation Logic 410 is the four channels of the A-format encoding of the input ambisonic audio signal, processed by AEC Logic 402, AEC Logic 404, AEC Logic 406 and AEC Logic 408 to remove Remote Audio Signal 348, and processed by Comfort Noise Generation Logic 410 to introduce comfort noise generated by Comfort Noise Generation Logic 410 as needed into the processed input ambisonic signal, e.g. during time periods in which the acoustic echo cancellation process coincidentally removed actual noise from the input ambisonic audio signal while removing Remote Audio Signal 348, and into which comfort noise must accordingly be inserted to avoid the introduction of distracting level fluctuations and/or periods of silence into the input ambisonic audio signal by the acoustic echo cancellation process. An example of the processing performed by Comfort Noise Estimation Logic 400 and Comfort Noise Generation Logic 410 is further described below with reference to FIGS. 9-12.

The output of Comfort Noise Generation Logic 410 is passed to Automatic Gain Control Logic 411, which performs automatic gain control on the input ambisonic audio signal. Automatic Gain Control Logic 411 processes the input ambisonic audio signal in order to equalize the volume level of the input ambisonic audio signal with regard to one or more other audio sources. For example, Automatic Gain Control Logic 411 may equalize the volume level of the input ambisonic audio signal with respect to a volume level of the audio received from the remote meeting equipment, e.g. so that the volume of the input ambisonic audio signal matches the volume of Remote Audio Signal 348 received from Virtual Reality Headset 344. To determine the volume level of the input ambisonic audio signal, Automatic Gain Control Logic 411 monitors the maximum energy of speech detected on each one of the channels in the input ambisonic audio signal. Those skilled in the art will recognize that measuring the maximum energy of speech may be accomplished through various different techniques, including, for example, tracking any specific metric which correlates to the loudness of speech in terms of how speech is perceived by a listener. The maximum energy detected in each channel of the input ambisonic audio signal is then used by Automatic Gain Control Logic 411 to determine an amount of adaptive gain to be applied to the input ambisonic audio signal, so that the volume of the input ambisonic audio signal is approximately the same as the volume of the audio received from the remote meeting equipment. Specifically, a single adaptive gain level is determined from the maximum energy level detected on each channel of the input ambisonic audio signal, and that single adaptive gain level is then independently applied to each of the channels of the input ambisonic audio signal. Accordingly, if the adaptive gain necessary for the input ambisonic audio signal to have a volume matching the Remote Audio Signal 348 is determined to be positive twenty decibels, then Automatic Gain Control Logic 411 independently increases the volume of each channel of the input ambisonic audio signal by twenty decibels.

By applying the same adaptive gain level to all of the channels in the input ambisonic audio signal, the disclosed techniques advantageously maintain the relative energies of the multiple channels of the input ambisonic audio signal, in order to preserve the spatial characteristics of the input ambisonic audio signal.

The output of Automatic Gain Control Logic 411 is then passed to Ambisonic A to B Format Conversion Logic 336, for conversion to a B-Format encoding of the input ambisonic audio signal, followed by processing of the B-Format encoding of the input ambisonic audio signal in Ambisonic B-Format Decoding Logic 338, as described above with reference to FIG. 3.

While AEC Logic 402, AEC Logic 404, AEC Logic 406, AEC Logic 408, Comfort Noise Estimation Logic 400, Comfort Noise Generation Logic 410 and Automatic Gain Control Logic 411 are shown for purposes of illustration as program code stored in Memory 316 and executable on Processing Circuitry 312, the disclosed techniques are not so limited, and alternatively one or more of AEC Logic 402, AEC Logic 404, AEC Logic 406, AEC Logic 408, Comfort Noise Estimation Logic 400, Comfort Noise Generation Logic 410 and Automatic Gain Control Logic 411 may be implemented partly or wholly in hardware circuitry.

While the example of FIG. 4 shows acoustic echo cancellation with comfort noise estimation and comfort noise generation being performed on an input ambisonic audio signal that is an ambisonic A-format encoding of the input ambisonic audio signal, the disclosed techniques are not so limited. Alternatively, and as shown in FIGS. 5-8 and discussed further below, the disclosed techniques for acoustic echo cancellation with comfort noise estimation and comfort noise generation shown in FIG. 4 may be performed on an ambisonic B-format encoding of the input ambisonic audio signal, or an output encoding that is decoded from the ambisonic B-format encoding of the input ambisonic audio signal.

Figure 5:
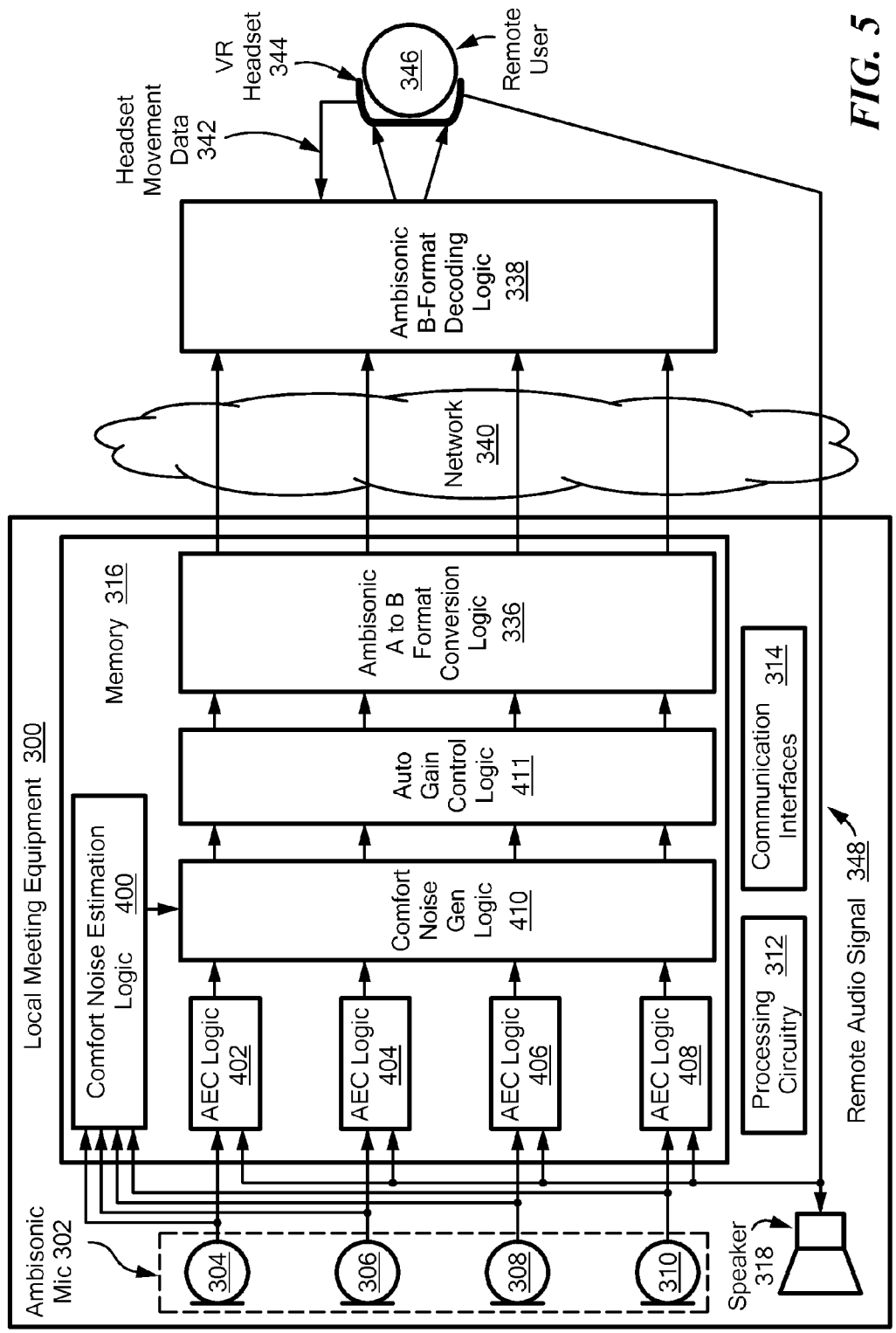
FIG. 5 is a block diagram showing an illustrative embodiment in which acoustic echo cancellation, comfort noise estimation and comfort noise generation are performed on an input ambisonic audio signal as in FIG. 4, but in which the output audio signal is a B-format encoding of the input ambisonic audio signal, and in which transmitting the output audio signal to the remote meeting equipment includes transmitting the B-format encoding of the input ambisonic audio signal from the local meeting equipment to the remote meeting equipment.

FIG. 5 is a block diagram showing an illustrative embodiment in which acoustic echo cancellation, comfort noise estimation and comfort noise generation are performed on an input ambisonic audio signal as in FIG. 4, but in which the output audio signal is a B-format encoding of the input ambisonic audio signal, and in which transmitting the output audio signal to the remote meeting equipment includes transmitting the B-format encoding of the input ambisonic audio signal from the local meeting equipment to the remote meeting equipment. As shown in FIG. 5, the B-format encoding of the input ambisonic audio signal that is generated by Ambisonic A to B Format Conversion Logic 336 is transmitted from Local Meeting Equipment 300 (e.g. using Communication Interfaces 314), over Network 340, to Ambisonic B-Format Decoding Logic 338. In the example of FIG. 5, Ambisonic B-Format Decoding Logic 338 is located or contained in remote meeting equipment, e.g. in Virtual Reality Headset 344 worn by Remote User 346 who is participating in the bidirectional real-time communication from a remote meeting environment.

Figure 6:
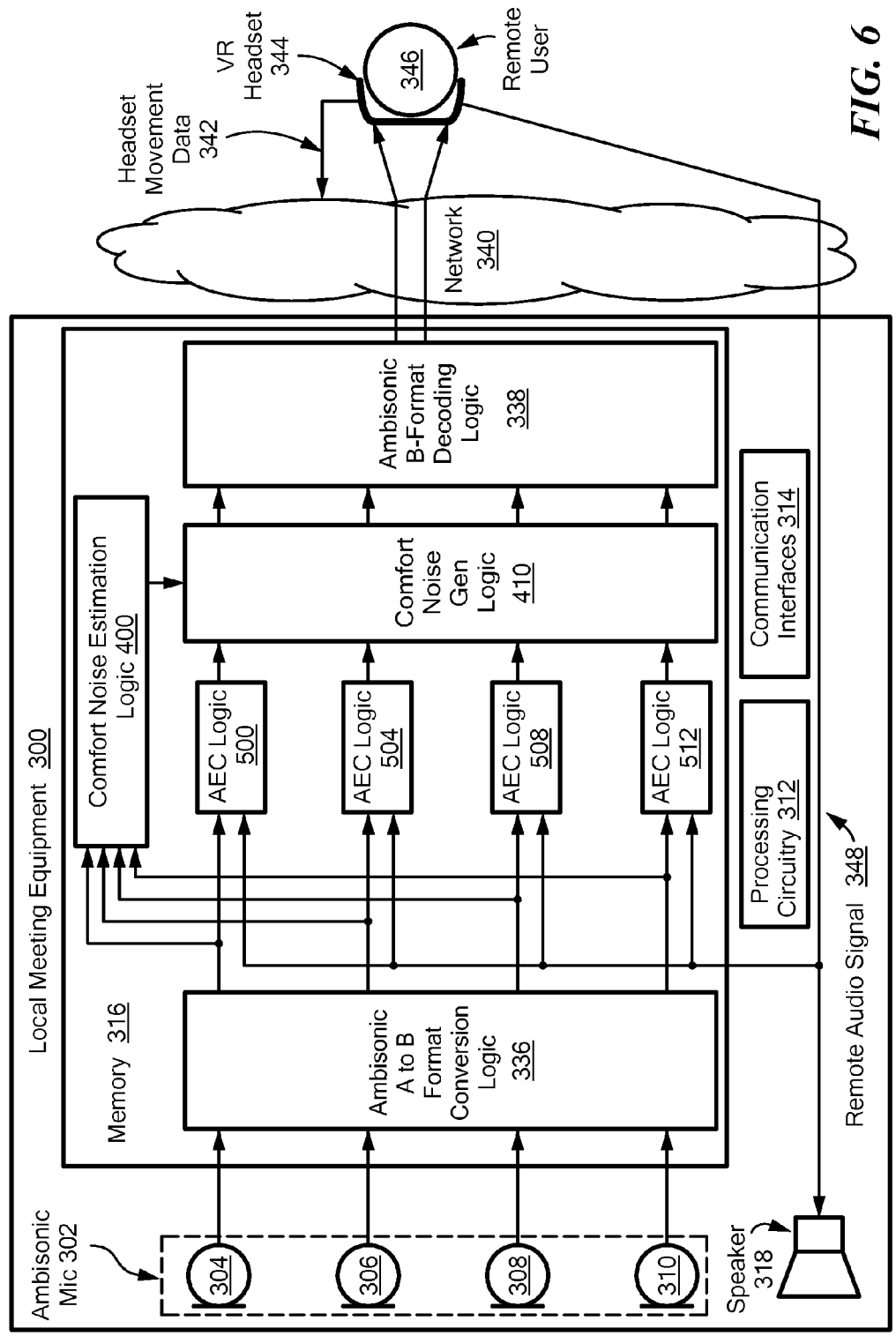
FIG. 6 is a block diagram showing an illustrative embodiment in which acoustic echo cancellation, comfort noise estimation and comfort noise generation are performed on an input ambisonic audio signal as in FIG. 4 but in which the input ambisonic audio signal on which acoustic echo cancellation, comfort noise estimation and comfort noise generation are performed is a B-format encoding of the input ambisonic audio signal.

FIG. 6 is a block diagram showing an illustrative embodiment in which acoustic echo cancellation, comfort noise estimation and comfort noise generation are performed on an input ambisonic audio signal as in FIG. 4, but in which the input ambisonic audio signal on which acoustic echo cancellation, comfort noise estimation and comfort noise generation are performed is a B-format encoding of the input ambisonic audio signal. Accordingly, in the example of FIG. 6, the remote audio signal is removed from a B-format encoding of the input ambisonic audio signal, and comfort noise is estimated and generated for the B-format encoding of the input the input ambisonic audio signal. As shown in FIG. 6, input ambisonic audio signal received from the Ambisonic Microphone 302 may be directly received as an A-Format encoding (e.g. PCM encoded) by Ambisonic A to B Format Conversion Logic 336. Ambisonic A to B Format Conversion Logic 336 converts the A-Format encoding of the input ambisonic audio signal to a B-Format encoding of the input ambisonic audio signal. Each channel of the B-Format encoding of the input ambisonic audio signal is then passed to a separate acoustic echo canceller. Specifically, a first channel of the B-Format encoding is passed to the AEC Logic 500, a second channel of the B-Format encoding is passed to the AEC Logic 504, a third channel of the B-Format encoding is passed to AEC Logic 508, and a fourth channel of the B-Format encoding is passed to AEC Logic 512. Each one of the acoustic echo cancellers performs acoustic echo cancellation on the respective one of the B-Format channels, e.g. AEC Logic 500 removes Remote Audio Signal 348 from a first channel of the B-Format encoding, AEC Logic 504 removes Remote Audio Signal 348 from a second channel of the B-Format encoding, AEC Logic 508 removes Remote Audio Signal 348 from a third channel of the B-Format encoding, and AEC Logic 514 removes Remote Audio Signal 348 from a fourth channel of the B-Format encoding.

Each channel of the B-Format encoding of the input ambisonic audio signal is also passed to the Comfort Noise Estimation Logic 400, which operates to estimate spatial and spectral characteristics of actual noise contained in the B-Format encoding of the input ambisonic audio signal, and Comfort Noise Generation Logic 410, which operates based on the estimation generated by Comfort Noise Estimation Logic 400 to generate comfort noise that matches the spatial and spectral characteristics of the actual noise contained in the B-Format encoding of the input ambisonic audio signal. In other words, Comfort Noise Generation Logic 410 generates comfort noise based on the estimation of the spatial and spectral characteristics of actual noise contained in the B-Format encoding of the input ambisonic audio signal, as estimated by Comfort Noise Estimation Logic 400, for insertion as need into the channels of the B-format encoding of the input ambisonic audio signal. After processing by the acoustic echo cancellers 500, 504, 508 and 512 and Comfort Noise Generation Logic 410, the channels of the B-format encoding of the input ambisonic audio signal are passed to Ambisonic B-Format Decoding Logic 338, for processing as described above with reference to FIG. 3.

While AEC Logic 500, AEC Logic 504, AEC Logic 508, and AEC Logic 512 are shown for purposes of illustration as program code stored in Memory 316 and executable on Processing Circuitry 312, the disclosed techniques are not so limited, and alternatively one or more of AEC Logic 500, AEC Logic 504, AEC Logic 508, and AEC Logic 512 may be implemented partly or wholly in hardware circuitry. Those skilled in the art will also recognize that the embodiment of FIG. 6 may further include the Automatic Gain Control Logic 411 described above with reference to FIG. 4.

Figure 7:
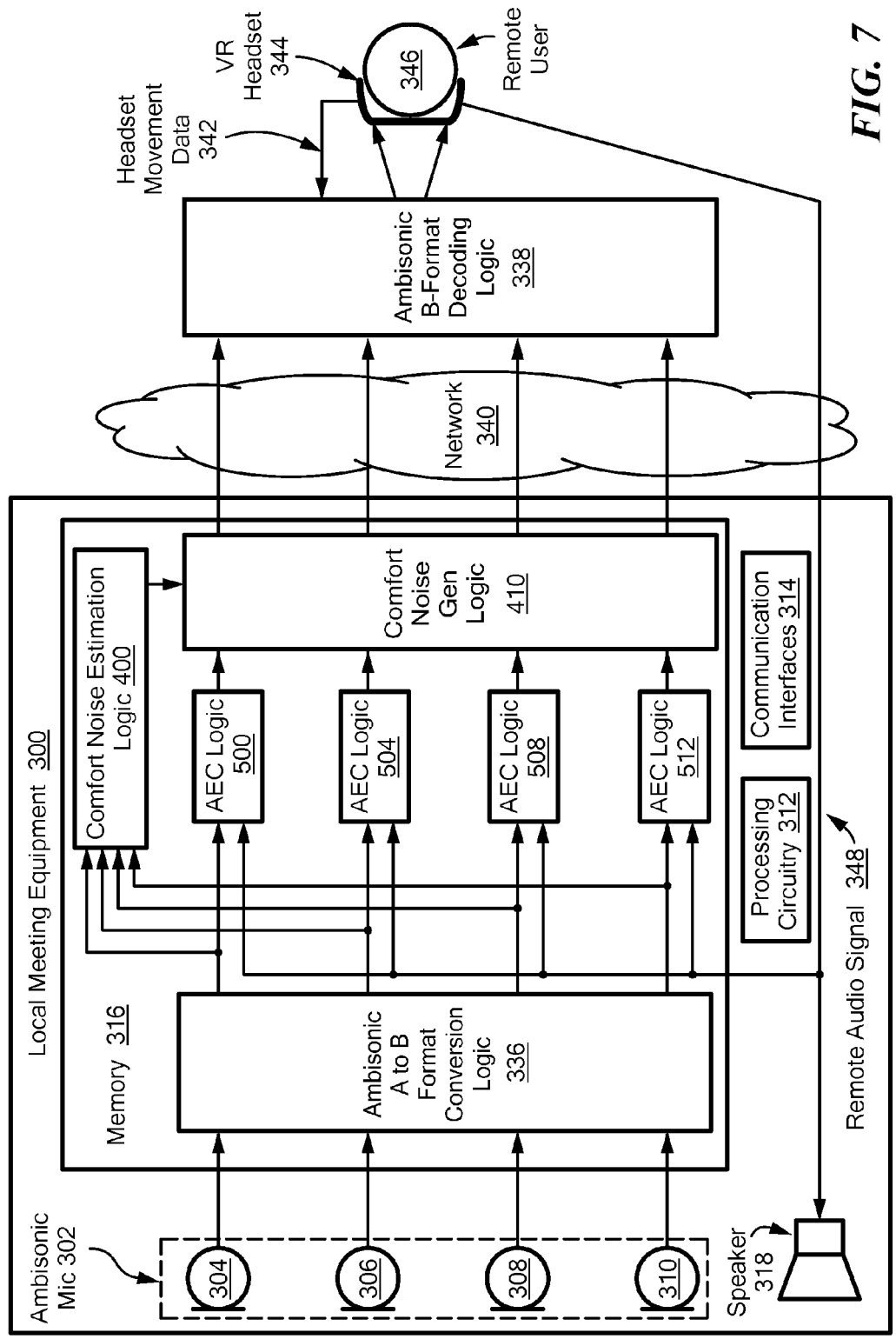
FIG. 7 is a block diagram showing an illustrative embodiment in which acoustic echo cancellation, comfort noise estimation and comfort noise generation are performed on an input ambisonic audio signal as in FIG. 6, but in which the output audio signal is a B-format encoding of the input ambisonic audio signal, and in which transmitting the output audio signal to the remote meeting equipment includes transmitting the B-format encoding of the input ambisonic audio signal from the local meeting equipment to the remote meeting equipment.

FIG. 7 is a block diagram showing an illustrative embodiment in which acoustic echo cancellation, comfort noise estimation and comfort noise generation are performed on an input ambisonic audio signal as in FIG. 6, but in which the output audio signal is a B-format encoding of the input ambisonic audio signal, and in which transmitting the output audio signal to the remote meeting equipment includes transmitting the B-format encoding of the input ambisonic audio signal from the local meeting equipment to the remote meeting equipment. As shown in FIG. 7, the B-format encoding of the input ambisonic audio signal that is generated by Ambisonic A to B Format Conversion Logic 336 is transmitted from Local Meeting Equipment 300 (e.g. using Communication Interfaces 314), over Network 340, to Ambisonic B-Format Decoding Logic 338. In the example of FIG. 7, Ambisonic B-Format Decoding Logic 338 is located or contained in remote meeting equipment, e.g. in Virtual Reality Headset 344 worn by Remote User 346 who is participating in the bidirectional real-time communication from a remote meeting environment.

Figure 8:
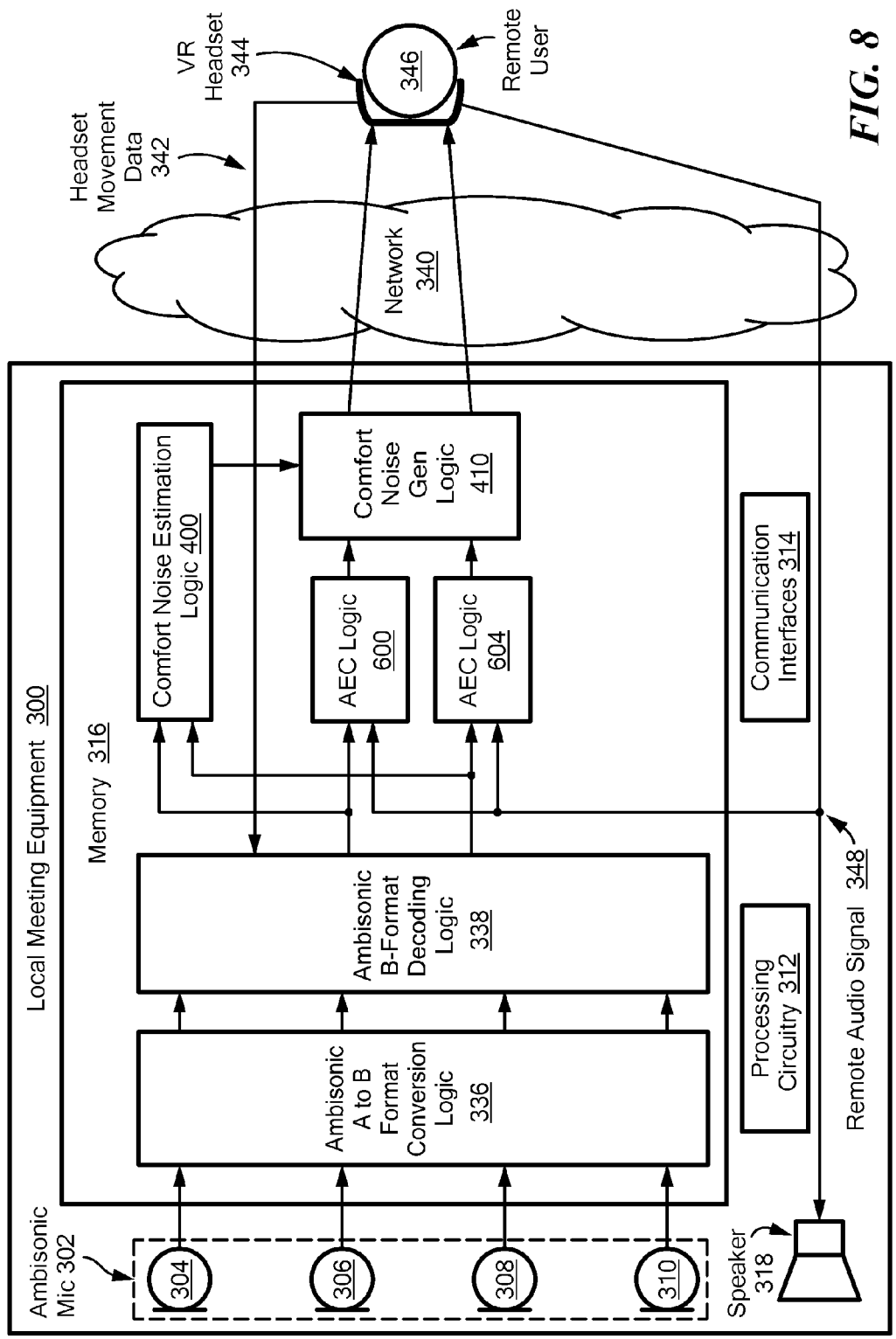
FIG. 8 is a block diagram showing an illustrative embodiment in which acoustic echo cancellation, comfort noise estimation and comfort noise generation are performed on an input ambisonic audio signal as in FIG. 4 but in which the input ambisonic audio signal on which acoustic echo cancellation, comfort noise estimation and comfort noise generation are performed is an output encoding of the input ambisonic audio signal.

FIG. 8 is a block diagram showing an illustrative embodiment in which acoustic echo cancellation, comfort noise estimation and comfort noise generation are performed on an input ambisonic audio signal as in FIG. 4, but in which the input ambisonic audio signal on which acoustic echo cancellation, comfort noise estimation and comfort noise generation are performed is an output encoding of the input ambisonic audio signal. Accordingly, in the example of FIG. 8, the remote audio signal is removed from an output encoding of the input ambisonic audio signal, and comfort noise is estimated and generated for the output encoding of the input the input ambisonic audio signal. As shown in FIG. 8, input ambisonic audio signal received from the Ambisonic Microphone 302 may be directly received as an A-Format encoding (e.g. PCM encoded) by Ambisonic A to B Format Conversion Logic 336. Ambisonic A to B Format Conversion Logic 336 converts the A-Format encoding of the input ambisonic audio signal to a B-Format encoding of the input ambisonic audio signal. Each channel of the B-Format encoding of the input ambisonic audio signal is then passed to Ambisonic B-format Decoding Logic 338 in Local Meeting Equipment 300. Ambisonic B-format Decoding Logic 338 responds to Headset Movement Data 342 by decoding the B-format encoding of the input ambisonic audio signal to an output encoding that provides three dimensional audio reflecting the current positional orientation of Virtual Reality Headset 344. In the example of FIG. 8, each channel of the output encoding is passed to a separate acoustic echo canceller. Specifically, a first channel of the output encoding is passed to the AEC Logic 600, and a second channel of the output encoding is passed to the AEC Logic 604. Each one of the acoustic echo cancellers performs acoustic echo cancellation on the respective one of the output encoding channels, e.g. AEC Logic 600 removes Remote Audio Signal 348 from a first channel of the output encoding (e.g. a "right" channel of a stereo encoding), and AEC Logic 604 removes Remote Audio Signal 348 from a second channel of the output encoding (e.g. a "left" channel of a stereo encoding).

Each channel of the B-Format encoding of the input ambisonic audio signal is also passed to the Comfort Noise Estimation Logic 400, which operates to estimate spatial and spectral characteristics of actual noise contained in output encoding of the input ambisonic audio signal, and Comfort Noise Generation Logic 410, which operates based on the estimation generated by Comfort Noise Estimation Logic 400 to generate comfort noise that matches the spatial and spectral characteristics of the actual noise contained in the output encoding of the input ambisonic audio signal. In other words, Comfort Noise Generation Logic 410 generates comfort noise based on the estimation of the spatial and spectral characteristics of actual noise contained in the output encoding of the input ambisonic audio signal, as estimated by Comfort Noise Estimation Logic 400, for insertion as need into the channels of the output encoding of the input ambisonic audio signal. After processing by the acoustic echo cancellers 600 and 604 and Comfort Noise Generation Logic 410, the output encoding of the input ambisonic audio signal is an example of the output audio signal that may be transmitted from Local Meeting Equipment 300, e.g. using Communication Interfaces 314, across Network 340 to the remote meeting equipment, e.g. to Virtual Reality Headset 344.

While AEC Logic 600 and AEC Logic 604 are shown for purposes of illustration as program code stored in Memory 316 and executable on Processing Circuitry 312, the disclosed techniques are not so limited, and alternatively one or more of AEC Logic 600 and AEC Logic 604 may be implemented partly or wholly in hardware circuitry. Those skilled in the art will also recognize that the embodiment of FIG. 8 may further include the Automatic Gain Control Logic 411 described above with reference to FIG. 4.

FIGS. 9-12 illustrate steps performed during operation of embodiments of the Comfort Noise Estimation Logic 400 and Comfort Noise Generation Logic 410 to estimate and generate comfort noise having the same spatial and spectral characteristics as actual noise contained in the input ambisonic audio signal. By generating comfort noise with the same spatial characteristics as actual noise contained in the input ambisonic audio signal, the disclosed techniques avoid generation of comfort noise that appears to originate from a different location than actual noise contained in the input ambisonic audio signal. By generating comfort noise with the same spectral characteristics as actual noise contained in the input ambisonic audio signal, the disclosed techniques avoid generation of comfort noise that has a noticeably different tonal quality than the actual noise contained in the input ambisonic audio signal.

As described above, the Ambisonic Microphone 302 output that is the input ambisonic audio signal processed by the disclosed techniques has multiple channels that are also known as signal components. The specific number of channels in a given ambisonic microphone depends on the order of the ambisonic microphone, within higher order ambisonic microphones having higher numbers of channels. In the case where Ambisonic Microphone 302 is embodied as a first order ambisonic microphone, the number of channels is four. As also described above, the pulse-code modulation (PCM) encoded signal of these channels is referred to as the A-format encoding of the input ambisonic audio signal. The techniques described with reference to FIGS. 9-12 may alternatively be applied to channels within a B-format encoding of the input ambisonic audio signal, or an output encoding of the input ambisonic audio signal.

The disclosed techniques estimate the spatial and spectral characteristics of actual noise in the input ambisonic audio signal that is caused by one or more actual noise sources located in the same physical environment in which Local Meeting Equipment 300 is also located, such as an air conditioner or fan running in a conference room. The disclosed estimation may, for example, be performed by the Comfort Noise Estimation Logic 400. The estimation is later used to generate comfort noise with the same spatial and spectral characteristics as in the estimation. The generation of such comfort noise may, for example, be performed by the Comfort Noise Generation Logic 410.

The spectral content of the actual noise in the input ambisonic audio signal is estimated by the disclosed techniques in what are generally referred to as frequency bands, or simply bands. A given band describes a portion of the input ambisonic audio signal within a specific interval of the frequency spectrum. In different embodiments of the disclosed techniques, various specific numbers of bands may be used. In FIGS. 9-12, the specific number of bands used is represented as M. As the number of bands used in an embodiment of the disclosed techniques increases, the quality of the comfort noise generated by Comfort Noise Generation Logic 410 also increases. The bands used by a given embodiment of the disclosed techniques may be spaced apart at equal distances, on a linear or logarithmic frequency scale, or spaced apart based on a user defined distribution.

Figure 9:
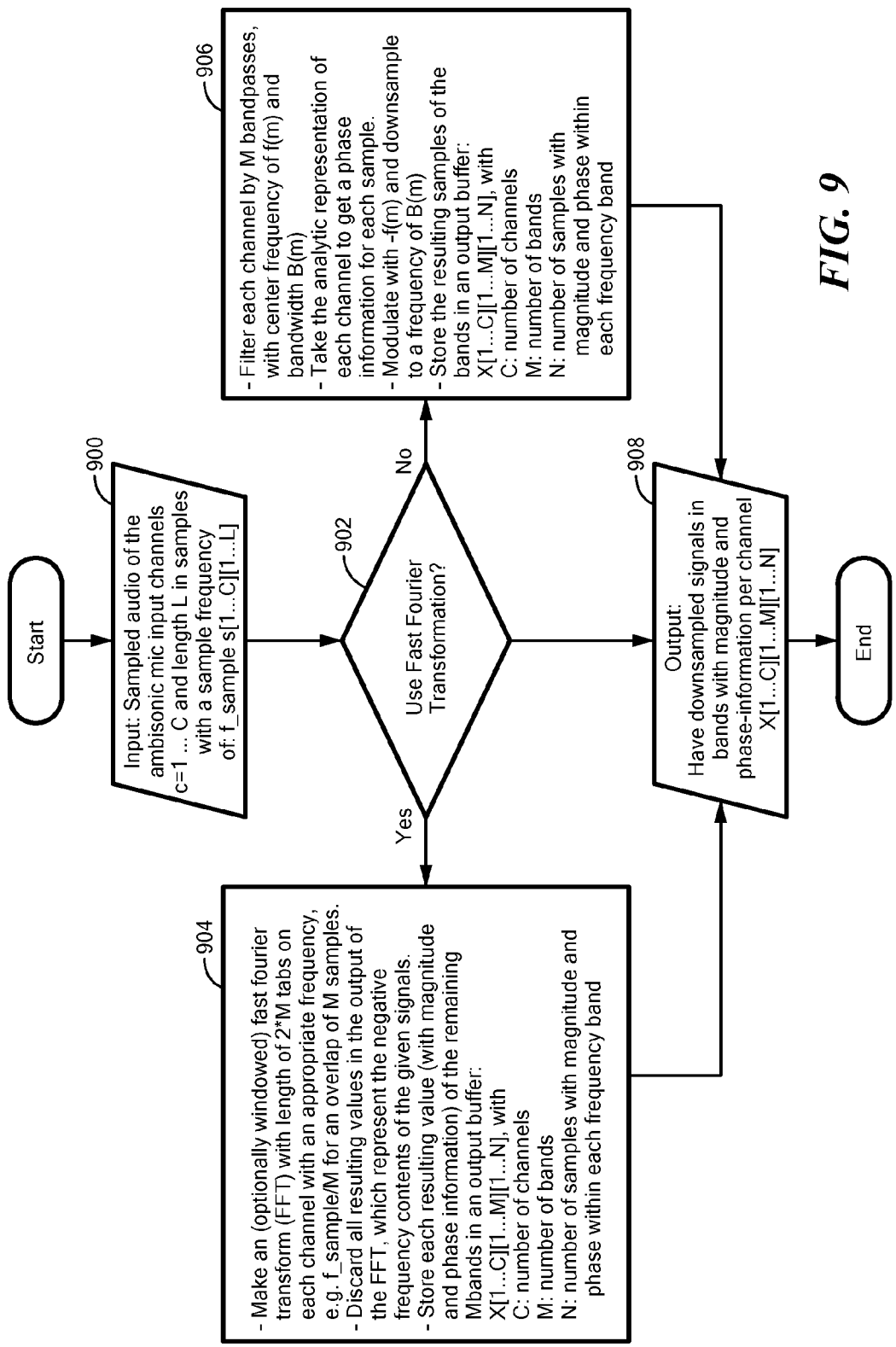
FIG. 9 is a flow chart showing steps performed in illustrative embodiments to generate down-sampled signals in bands with phase-information per channel in the input ambisonic audio signal while estimating comfort noise to be inserted into the input ambisonic audio signal.

The spatial contents of the actual noise in the input ambisonic audio signal is defined by the coherence of the microphone channels within the input ambisonic audio signal, which is a measure of linear dependency, and by their relative delay. In the analytic representation of the signals in the channels used in the disclosed techniques, the delay is represented by relative phase information between the channels. Based on the analytic representation of the signals in the channels, the disclosed techniques use a covariance matrix of the analytic representation of the signals in each band to derive three metrics:

Level of noise for each channel in each band
Coherence of noise between the channels
Relative delay of the noise between the microphones FIG. 9 is a flow chart showing an example of steps performed in illustrative embodiments to generate downsampled signals in bands with phase-information per channel in the process of estimating comfort noise. The steps shown in FIG. 9 may, for example, be performed by the Comfort Noise Estimation Logic 400.

At step 900, Comfort Noise Estimation Logic 400 receives the A-format encoding of the input ambisonic audio signal, consisting of PCM encoded audio that is sampled from each of the channels in the input ambisonic audio signal. Alternatively at step 900, Comfort Noise Estimation Logic 400 may receive a B-format encoding of the input ambisonic audio signal, or an output encoding of the input ambisonic audio signal. Sampled audio is received from each channel c for channels 1 through C of the input ambisonic audio, with a sample frequency of f_sample and a length of L.

As further shown in FIG. 9, multiple specific approaches may be used to transform the signals in the channels of the input ambisonic audio signal into the analytic representation, which is an example of "complex-valued filterbanks". Step 902 indicates that embodiments using fast Fourier transformations ("FFTs") use the techniques shown in step 904, while alternative embodiments that do not use fast Fourier transformations use the techniques shown in step 906.

In step 904, in an embodiment that uses fast Fourier transformations, Comfort Noise Estimation Logic 400 operates on windows with a length of 2M samples and produces, after optionally applying an appropriate window function (e.g. a Hanning window) an output of 2M bands with complex values containing both sample and phase information. Half of the bands correspond to negative frequency components which can be ignored, and are discarded. The remaining M bands are spaced apart at equal distances on a linear frequency scale and reflect the complex value samples per band, and are stored in an output buffer X[1 . . . C][1 . . . M[1 . . . N], where C is the number of channels, M is the number of bands, and N is the number of complex value samples within each frequency band.

Because each band is limited in bandwidth (B) for each band m as follows: B(m)=f_sample/M, where f_sample is the sampling frequency of the original signals, and the exact bandwidth is dependent on other factors such as the FFT window, it is sufficient to calculate the FFT in step 904 for every Mth sample, such that N=L/M. This step is called downsampling and reduces computational complexity.

Step 906 shows processing performed by alternative embodiments of Comfort Noise Estimation Logic 400 that do not use fast Fourier transformations. As shown in step 906, such an alternative embodiment may transform the signals in the channels of the input ambisonic audio signal into the analytic representation by performing the following steps:

1. Filter each channel of the input ambisonic audio signal by an appropriate bandpass. This generates M filtered signals per channel.
2. Remove all negative frequency components.
3. Modulate each band by its negative center frequency.
4. Downsample the resulting signal to a frequency, which is equivalent to its bandwidth.

In both those embodiments that use fast Fourier transformations as shown in step 904, and in alternative embodiments that do not use fast Fourier transformations as shown in step 906, the same output of the steps of FIG. 9 is shown at 908, consisting of downsampled signals in bands with phase information per channel, i.e. X[1 . . . C][1 . . . M[1 . . . N].

Figure 10:
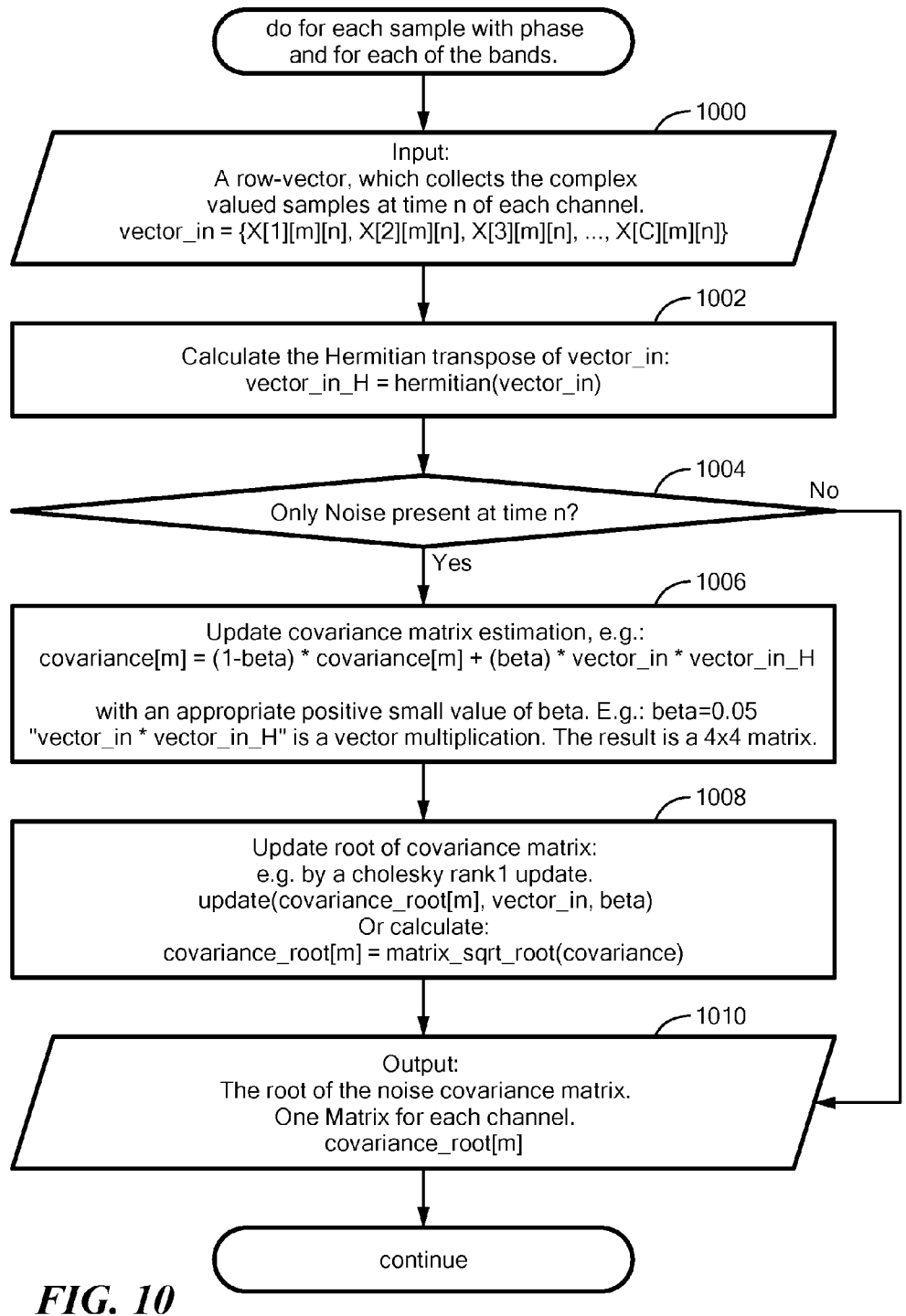
FIG. 10 is a flow chart showing steps performed in illustrative embodiments to generate a root of a noise covariance matrix for each channel in the input ambisonic audio signal while estimating comfort noise to be inserted into the input ambisonic audio signal.

FIG. 10 is a flow chart showing steps performed in an illustrative embodiment to generate a root of a noise covariance matrix for each channel in the input ambisonic audio signal while estimating comfort noise. The steps of FIG. 10 may, for example, be performed by Comfort Noise Estimation Logic 400.

As shown in the steps of FIG. 10, in the noise covariance matrix of the disclosed techniques, the matrix element at the i-th row and j-th column contains the covariance between the i-th and j-th channel of the input ambisonic audio signal. The covariance between a pair of microphones is the expected value of the multiplication of a sample of the i-th channel and the conjugated sample seen at the same time in the j-th channel. The mean value of the samples of both signals is subtracted beforehand. Because the signals of interest are expected to be free of any mean and are ergodic, the disclosed techniques replace the 'expectation' and use the average over time of the multiplication of both. The average over time can, for example, be accomplished by an exponential smoothing, but other alternative embodiments are also feasible. The noise covariance matrix is only updated during periods of time in the input ambisonic audio signal that contain only noise. Because the noise covariance matrix is updated using a matrix with appropriate properties, the disclosed techniques can also be used to update the root of the noise covariance matrix. One example of such a property is a rank 1 matrix (a matrix with a single non-zero eigenvalue), and as a consequence the Cholesky update of the matrix root.

Specifically, as illustrated in FIG. 10, the steps of FIG. 10 are performed for each sample with phase information (for each complex value) and for each of the bands after performing the steps of FIG. 9. At step 1000, an input is generated consisting of a row-vector which collects the complex value samples (each complex value sample=sample value plus phase information) at time n for each channel:

vector_in={X[1][m][n], X[2][m][n], X[3][m][n], . . . , X[C][m][n]}

At step 1002 a Hermitian transpose is calculated for vector_in:

vector_in_H=Hermitian(vector_in)

At step 1004, the disclosed techniques ensure that the noise covariance matrix is only updated during periods of time in the input ambisonic audio signal that contain only noise.

At step 1006, the covariance matrix estimation is updated, e.g. as follows:

covariance[$m$]=(1−beta)*covariance[$m$]+ (beta)*vector_in*vector_in_$H$ with an appropriately small value of beta, e.g. beta=0.05 and where "vector_in*vector_in_H" is a vector multiplication, the result of which is a C×C matrix.

At step 1008 the root of the covariance matrix is updated, e.g. by a Cholesky rank-one update:

update(covariance_root[m], vector_in, beta)

Alternatively, at step 1008 the root of the covariance matrix may be updated by the following calculation:

covariance_root[m]=matrix_sqrt_root(covariance)

At step 1010 the output is the root of the noise covariance matrix, one matrix for each channel: covariance_root[m].

Figure 11:
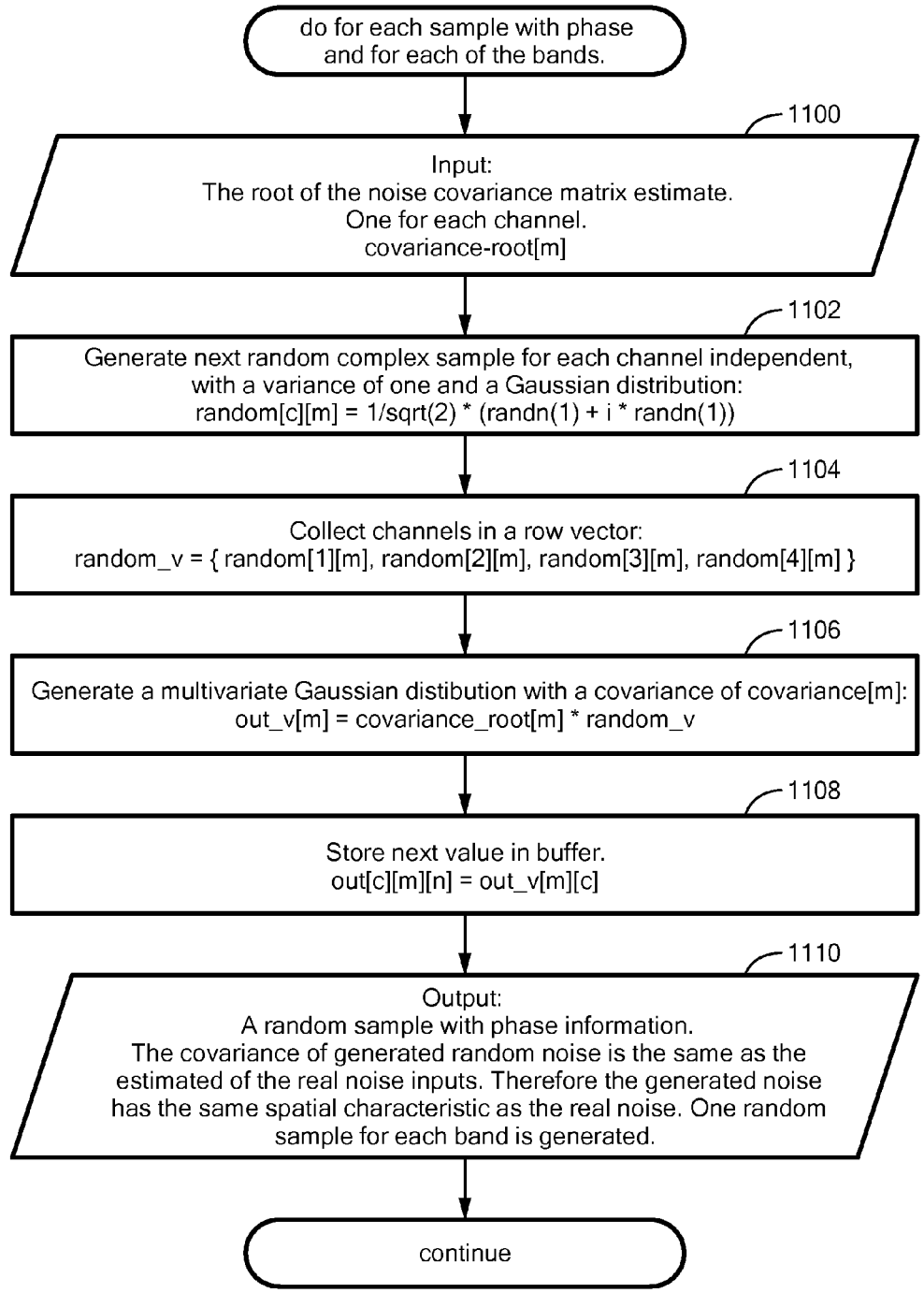
FIG. 11 is a flow chart showing steps performed in illustrative embodiments to generate comfort noise with the same spatial and spectral characteristic as measured on the actual noise contained in the input ambisonic audio signal.

FIG. 11 is a flow chart showing steps performed in an illustrative embodiment to generate comfort noise with the same spatial and spectral characteristics as measured on the actual noise contained in the input ambisonic audio signal. The steps of FIG. 11 may, for example, be performed by Comfort Noise Generation Logic 410 shown in FIG. 4. Comfort Noise Generation Logic 410 generates a multivariate Gaussian noise with the same spatial and spectral characteristic as were detected by Comfort Noise Estimation Logic 400 in the actual noise within the input ambisonic audio signal. To accomplish this, in the disclosed techniques, the noise covariance matrix generated by Comfort Noise Estimation Logic 400 and a noise covariance matrix used by Comfort Noise Generation Logic 410 must be the same. First, the Comfort Noise Generation Logic 410 generates C independent noise sources, with a zero mean signal and a variance of one (one for each channel of the input ambisonic audio signal). The initial covariance matrix for the independent noise sources is identical to the identity matrix (ones on all primary diagonal elements, and zeroes on all secondary diagonals). The Comfort Noise Generation Logic 410 then transforms the noise signals by the root of the noise covariance matrix generated by the Comfort Noise Estimation Logic 400 to obtain a new set of noise signals with the desired properties, i.e. a set of noise signals that match the spatial and spectral characteristics of the noise contained within the input ambisonic audio signal.

Specifically, as shown in FIG. 11, the steps of FIG. 11 are performed for each sample with phase information (complex value) and for each of the bands after performing the steps of FIG. 10. At step 1100, an input is generated consisting of the root of the noise covariance matrix, one for each band: covariance_root[m].

At step 1102 a next random complex sample is generated for each channel, independently, with a variance of one and a Gaussian distribution:

random[c][m]=1/sqrt(2)*(randn(1)+$i$*randn(1))

At step 1104, channels are collected in a row vector:

random_v={random[1][m], random[2][m], random[3][m], random[4][m]}

At step 1106, a multivariate Gaussian distribution is generated with a covariance of covariance[m]:

out_v[m]=covariance_root[m]*random_v

At step 1108 the next value is stored in the buffer:

out[c][m][n]=out_v[m][c]

At step 1110 the output is a random sample with phase information. The covariance of the generated random noise is the same as the covariance of the actual noise in the input ambisonic audio signal. Therefore the noise generated by Comfort Noise Generation Logic 410 has the same spatial and spectral characteristics as the actual noise in the input ambisonic audio signal. One random sample for each band is generated.

Figure 12:
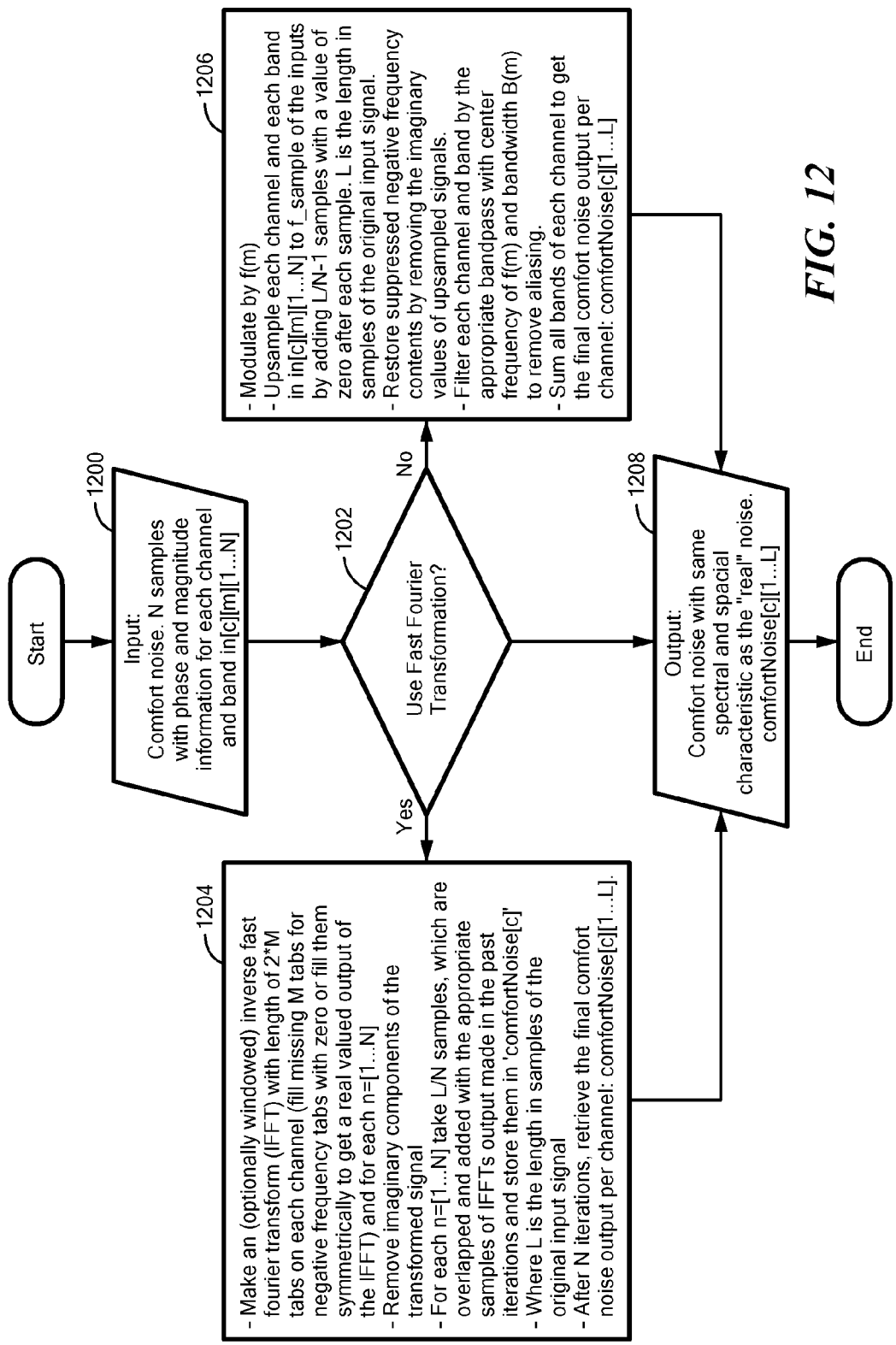
FIG. 12 is a flow chart showing steps performed in illustrative embodiments to insert automatically generated comfort noise into the input ambisonic audio signal, in order to avoid the creation of audible and potentially distracting level fluctuations and/or to mask residual echo introduced during the acoustic echo cancellation process while performing acoustic echo cancellation on the input ambisonic audio signal.

FIG. 12 is a flow chart showing steps performed in an illustrative embodiment to insert the automatically generated comfort noise into the output signal to replace the actual noise contained in the input ambisonic audio signal. The steps of FIG. 12 are performed after performance of the steps in FIG. 11. The steps of FIG. 12 may, for example, be performed by the Comfort Noise Generation Logic 410. The steps of FIG. 12 transforms the signals from their analytic downsampled representation in bands back, for example, to a PCM encoded time domain signal (e.g. the A-Format encoding of the input ambisonic audio signal). As shown in FIG. 12, the steps described with reference to FIG. 9 are effectively reversed. As a result, Comfort Noise Generation Logic 410 generates a comfort noise signal for each one of the C channels that has spatial and spectral characteristics that are very similar to the actual noise generated by a natural noise source located in the same acoustic environment as Local Meeting Equipment 300. The degree of similarity between the generated comfort noise and the actual noise is dependent on the number of bands M used by a given embodiment. Comfort Noise Generation Logic 410 mixes the generated comfort noise into the outputs of acoustic echo cancellers whenever necessary. For example, the generated comfort noise may be inserted into the input ambisonic audio signal after processing by the acoustic echo cancellers removed, in addition to Remote Audio Signal 348, actual noise from the input ambisonic audio signal, that needs to be replaced in order to avoid distracting level fluctuations and/or periods of silence in the input ambisonic audio signal after processing by the acoustic echo cancellers.

Specifically, as shown in FIG. 12, at step 1200 an input is received that is comfort noise, consisting of samples including phase information (complex samples), with one noise signal per channel and band.

As shown at step 1202, and as discussed above with reference to FIG. 9, multiple specific approaches may be used. Step 1202 indicates that the embodiments using fast Fourier transformations ("FFTs") use the techniques shown in step 1204, while alternative embodiments that do not use fast Fourier transformations use the techniques shown in step 1206.

For embodiments using fast Fourier transformations, at step 1204 for each sample n=[1 . . . N] an optionally windowed inverse fast Fourier transformation (IFFT) is performed with length of 2*M tabs on each channel, where the M tabs are filled with the samples present on the M bands at sample-position n and the missing M tabs for negative frequencies which are filled symmetrically to obtain a real valued output. Alternatively the missing M tabs may be filled with zero, in which case the imaginary components must be removed from the IFFT output.

The final comfort noise is retrieved per channel as comfortNoise[c][1 . . . L] by overlap and add of each IFFT output as follows: Each IFFT produces 2M samples of output, but only M samples (where M=L/N) are needed (as long as the signal in the analysis step was downsampled by a factor of M). Each output-frame of the IFFT is overlapped 50% with the output-frame of the IFFT of the last execution period. For each IFFT the M overlapping samples are summed and collected into an output array. Because the IFFT was executed N times, an output-array with a length of L is the result.

In alternative embodiments that do not use fast Fourier transforms, step 1206 is performed instead of step 1204. In step 1206, the following steps are performed:

Modulate by f(m)
- Upsample each channel, each band and each sample in out[c][m][1 . . . N] to f_sample of the inputs by adding zeros. This step generates an array with the dimensions out[c][m][1 . . . L].
- Restore suppressed negative frequency contents by removing the imaginary values of the upsampled signals
- Filter each channel and band by the appropriate bandpass with center frequency of f(m) and bandwidth B(m) to remove aliasing
- Sum all bands of each channel to get the final comfort noise output per channel: comfortNoise [c] [1 . . . L]

In both those embodiments that use fast Fourier transformations as shown in step 1204, and in alternative embodiments that do not use fast Fourier transformations as shown in step 1206, the same output of the steps of FIG. 12 is shown at 1208, consisting of comfort noise having the same spatial and spectral characteristics as the actual noise in the input ambisonic audio signal: comfortNoise[c][1 . . . L].

While the above description provides examples of embodiments using various specific terms to indicate specific systems, devices, and/or components, such terms are illustrative only, and are used only for purposes of convenience and concise explanation. The disclosed system is not limited to embodiments including or involving systems, devices and/or components identified by the terms used above.

As will be appreciated by one skilled in the art, aspects of the technologies disclosed herein may be embodied as a system, method or computer program product. Accordingly, each specific aspect of the present disclosure may be embodied using hardware, software (including firmware, resident software, micro-code, etc.) or a combination of software and hardware. Furthermore, aspects of the technologies disclosed herein may take the form of a computer program product embodied at least in part in one or more non-transitory computer readable storage medium(s) having computer readable program code stored thereon for causing one or more processors and/or a computer system to carry out those aspects of the present disclosure.

Any combination of one or more non-transitory computer readable storage medium(s) may be utilized. Examples of a non-transitory computer readable storage medium include, but are not limited to, an optical disc (e.g. CD or DVD), an optical storage device, a magnetic disk, a magnetic storage device, a random access memory (RAM), a read-only memory (ROM), an erasable programmable read-only memory (EPROM or Flash memory), and/or any suitable combination of the foregoing. In the context of this document, a computer readable storage medium may be any non-transitory tangible medium that can contain, or store a program for use by or in connection with an instruction execution system, apparatus, or device.

The figures include block diagram and flowchart illustrations of methods, apparatus(s) and computer program products according to one or more embodiments of the invention. It will be understood that each block in such figures, and combinations of these blocks, can be implemented by computer program instructions. These computer program instructions may be executed on processing circuitry to form specialized hardware. These computer program instructions may further be loaded onto a computer or other programmable data processing apparatus to produce a machine, such that the instructions which execute on the computer or other programmable data processing apparatus create means for implementing the functions specified in the block or blocks. These computer program instructions may also be stored in a computer-readable memory that can direct a computer or other programmable data processing apparatus to function in a particular manner, such that the instructions stored in the computer-readable memory produce an article of manufacture including instruction means which implement the function specified in the block or blocks. The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions specified in the block or blocks.

While the invention is described through the above exemplary embodiments, it will be understood by those of ordinary skill in the art that modification to and variation of the illustrated embodiments may be made without departing from the inventive concepts herein disclosed.

What is claimed is:

1. A method of processing ambisonic audio to provide three dimensional audio during a bidirectional real-time communication session between local meeting equipment and remote meeting equipment, comprising:
    receiving, during the bidirectional real-time communication session, an input ambisonic audio signal, the input ambisonic audio signal including a plurality of channels, wherein each channel in the input ambisonic audio signal is made up of audio data representing sound captured by an ambisonic microphone located in the local meeting equipment;
    receiving a remote audio signal, wherein the remote audio signal is made up of audio data representing sound captured by a microphone contained in remote meeting equipment, and wherein the remote audio signal is passed to at least one local loudspeaker located in the local meeting equipment for output by the local loudspeaker as sound;
    in response to the input ambisonic audio signal and the remote audio signal, generating an output audio signal by performing acoustic echo cancellation on the input ambisonic audio signal, wherein performing the acoustic echo cancellation removes the remote audio signal from the input ambisonic audio signal;
    wherein performing the acoustic echo cancellation on the input ambisonic audio signal includes introducing comfort noise into the input ambisonic audio signal;
    wherein introducing the comfort noise into the input ambisonic audio signal includes estimating spatial and spectral characteristics of noise in the input ambisonic audio signal and generating comfort noise that matches the spatial and spectral characteristics of the noise in the input ambisonic audio signal;
    generating an A-format encoding of the input ambisonic audio signal, wherein the A-format encoding of the input ambisonic audio signal comprises a pulse-code modulation encoding of the audio data in each channel of the input ambisonic audio signal;
    wherein performing the acoustic echo cancellation on the input ambisonic audio signal includes removing the remote audio signal from the A-format encoding of the input ambisonic audio signal; and transmitting the output audio signal from the local meeting equipment to the remote meeting equipment for playback through at least two loudspeakers in the remote meeting equipment during the bidirectional real-time communication session.

2. The method of claim 1, further comprising:
after removing the remote audio signal from the A-format encoding of the input ambisonic audio signal, generating a B-format encoding of the input ambisonic audio signal from the A-format encoding of the input ambisonic audio signal, wherein the B-format encoding of the input audio signal is a loudspeaker configuration independent encoding of the input ambisonic audio signal;
wherein the output audio signal comprises the B-format encoding of the input ambisonic audio signal; and
wherein transmitting the output audio signal to the remote meeting equipment comprises transmitting the B-format encoding of the input ambisonic audio signal from the local meeting equipment to the remote meeting equipment.

3. The method of claim 1, further comprising:
after removing the remote audio signal from the A-format encoding of the input ambisonic audio signal, generating a B-format encoding of the input ambisonic audio signal from the A-format encoding of the input ambisonic audio signal, wherein the B-format encoding of the input audio signal is a loudspeaker configuration independent encoding of the input ambisonic audio signal;
generating an output encoding of the input ambisonic audio signal from the B-format encoding of the input ambisonic audio signal;
wherein the output audio signal comprises the output encoding of the input ambisonic audio signal; and
wherein transmitting the output audio signal to the remote meeting equipment comprises transmitting the output encoding of the input ambisonic audio signal to the remote meeting equipment.

4. The method of claim 3 wherein the remote meeting equipment includes a virtual reality headset, and further comprising:
receiving, from the virtual reality headset in the remote meeting equipment, data describing movements of the virtual reality headset;
wherein generating the output encoding of the input ambisonic audio signal from the B-format encoding of the input ambisonic audio signal is responsive to the data describing movements of the virtual reality headset; and
wherein the output encoding of the input ambisonic audio signal provides three dimensional audio reflecting a current positional orientation of the virtual reality headset.

5. The method of claim 1, further comprising:
performing automatic gain control on the input ambisonic audio signal by i) monitoring a maximum energy detected on each one of the channels in the input ambisonic audio signal, ii) determining a single adaptive gain level based on the maximum energy detected on each one of the channels in the input ambisonic audio signal, and iii) applying the single adaptive gain level to each one of the channels in the input ambisonic audio signal.

6. A method of processing ambisonic audio to provide three dimensional audio during a bidirectional real-time communication session between local meeting equipment and remote meeting equipment, comprising:
receiving, during the bidirectional real-time communication session, an input ambisonic audio signal, the input ambisonic audio signal including a plurality of channels, wherein each channel in the input ambisonic audio signal is made up of audio data representing sound captured by an ambisonic microphone located in the local meeting equipment;
receiving a remote audio signal, wherein the remote audio signal is made up of audio data representing sound captured by a microphone contained in remote meeting equipment, and wherein the remote audio signal is passed to at least one local loudspeaker located in the local meeting equipment for output by the local loudspeaker as sound;
in response to the input ambisonic audio signal and the remote audio signal, generating an output audio signal by performing acoustic echo cancellation on the input ambisonic audio signal, wherein performing the acoustic echo cancellation removes the remote audio signal from the input ambisonic audio signal;
wherein performing the acoustic echo cancellation on the input ambisonic audio signal includes introducing comfort noise into the input ambisonic audio signal;
wherein introducing the comfort noise into the input ambisonic audio signal includes estimating spatial and spectral characteristics of noise in the input ambisonic audio signal and generating comfort noise that matches the spatial and spectral characteristics of the noise in the input ambisonic audio signal;
generating an A-format encoding of the input ambisonic audio signal, wherein the A-format encoding of the input ambisonic audio signal comprises a pulse-code modulation encoding of the audio data in each channel of the input ambisonic audio signal;
generating a B-format encoding of the input ambisonic audio signal from the A-format encoding of the input ambisonic audio signal, wherein the B-format encoding of the input audio signal is a loudspeaker configuration independent encoding of the input ambisonic audio signal;
wherein performing the acoustic echo cancellation on the input ambisonic audio signal includes removing the remote audio signal from the B-format encoding of the input ambisonic audio signal; and
transmitting the output audio signal from the local meeting equipment to the remote meeting equipment for playback through at least two loudspeakers in the remote meeting equipment during the bidirectional real-time communication session.

7. The method of claim 6, wherein the output audio signal comprises the B-format encoding of the input ambisonic audio signal; and
wherein transmitting the output audio signal to the remote meeting equipment comprises transmitting the B-format encoding of the input ambisonic audio signal to the remote meeting equipment.

8. The method of claim 6, further comprising:
after removing the remote audio signal from the B-format encoding of the input ambisonic audio signal, generating an output encoding of the input ambisonic audio signal from the B-format encoding of the input ambisonic audio signal;
wherein the output audio signal comprises the output encoding of the input ambisonic audio signal; and wherein transmitting the output audio signal to the remote meeting equipment comprises transmitting the output encoding of the input ambisonic audio signal to the remote meeting equipment.

9. The method of claim 6, further comprising:
performing automatic gain control on the input ambisonic audio signal by i) monitoring a maximum energy detected on each one of the channels in the input ambisonic audio signal, ii) determining a single adaptive gain level based on the maximum energy detected on each one of the channels in the input ambisonic audio signal, and iii) applying the single adaptive gain level to each one of the channels in the input ambisonic audio signal.

10. A method of processing ambisonic audio to provide three dimensional audio during a bidirectional real-time communication session between local meeting equipment and remote meeting equipment, comprising:
receiving, during the bidirectional real-time communication session, an input ambisonic audio signal, the input ambisonic audio signal including a plurality of channels, wherein each channel in the input ambisonic audio signal is made up of audio data representing sound captured by an ambisonic microphone located in the local meeting equipment;
receiving a remote audio signal, wherein the remote audio signal is made up of audio data representing sound captured by a microphone contained in remote meeting equipment, and wherein the remote audio signal is passed to at least one local loudspeaker located in the local meeting equipment for output by the local loudspeaker as sound;
in response to the input ambisonic audio signal and the remote audio signal, generating an output audio signal by performing acoustic echo cancellation on the input ambisonic audio signal, wherein performing the acoustic echo cancellation removes the remote audio signal from the input ambisonic audio signal;
wherein performing the acoustic echo cancellation on the input ambisonic audio signal includes introducing comfort noise into the input ambisonic audio signal;
wherein introducing the comfort noise into the input ambisonic audio signal includes estimating spatial and spectral characteristics of noise in the input ambisonic audio signal and generating comfort noise that matches the spatial and spectral characteristics of the noise in the input ambisonic audio signal;
generating an A-format encoding of the input ambisonic audio signal, wherein the A-format encoding of the input ambisonic audio signal comprises a pulse-code modulation encoding of the audio data in each channel of the input ambisonic audio signal;
generating a B-format encoding of the input ambisonic audio signal from the A-format encoding of the input ambisonic audio signal, wherein the B-format encoding of the input audio signal is a loudspeaker configuration independent encoding of the input ambisonic audio signal;
generating an output encoding of the input ambisonic audio signal from the B-format encoding of the input ambisonic audio signal;
wherein performing the acoustic echo cancellation on the input ambisonic audio signal includes removing the remote audio signal from the output encoding of the input ambisonic audio signal; and
transmitting the output audio signal from the local meeting equipment to the remote meeting equipment for playback through at least two loudspeakers in the remote meeting equipment during the bidirectional real-time communication session.

11. The method of claim 10, further comprising:
performing automatic gain control on the input ambisonic audio signal by i) monitoring a maximum energy detected on each one of the channels in the input ambisonic audio signal, ii) determining a single adaptive gain level based on the maximum energy detected on each one of the channels in the input ambisonic audio signal, and iii) applying the single adaptive gain level to each one of the channels in the input ambisonic audio signal.

12. An electronic system, comprising:
processing circuitry; and
memory communicably coupled to the processing circuitry, the memory storing program code for processing ambisonic audio to provide three dimensional audio during a bidirectional real-time communication session between local meeting equipment and remote meeting equipment, wherein the program code, when executed by the processing circuitry, causes the processing circuitry to:
receive, during the bidirectional real-time communication session, an input ambisonic audio signal, the input ambisonic audio signal including a plurality of channels, wherein each channel in the input ambisonic audio signal is made up of audio data representing sound captured by an ambisonic microphone located in the local meeting equipment;
receive a remote audio signal, wherein the remote audio signal is made up of audio data representing sound captured by a microphone contained in remote meeting equipment, and wherein the remote audio signal is passed to at least one local loudspeaker located in the local meeting equipment for output by the local loudspeaker as sound;
in response to the input ambisonic audio signal and the remote audio signal, generate an output audio signal by performing acoustic echo cancellation on the input ambisonic audio signal, wherein performing the acoustic echo cancellation removes the remote audio signal from the input ambisonic audio signal;
wherein the acoustic echo cancellation is performed on the input ambisonic audio signal at least in part by introducing comfort noise into the input ambisonic audio signal;
wherein the comfort noise is introduced into the input ambisonic audio signal at least in part by estimating spatial and spectral characteristics of noise in the input ambisonic audio signal and generating comfort noise that matches the spatial and spectral characteristics of the noise in the input ambisonic audio signal;
generate an A-format encoding of the input ambisonic audio signal, wherein the A-format encoding of the input ambisonic audio signal comprises a pulse-code modulation encoding of the audio data in each channel of the input ambisonic audio signal;
wherein the acoustic echo cancellation is performed on the input ambisonic audio signal at least in part by removing the remote audio signal from the A-format encoding of the input ambisonic audio signal; and
transmit the output audio signal from the local meeting equipment to the remote meeting equipment for playback through at least two loudspeakers in the remote meeting equipment during the bidirectional real-time communication session.

13. The electronic system of claim 12, wherein the program code, when executed by the processing circuitry, further causes the processing circuitry to:
   after removing the remote audio signal from the A-format encoding of the input ambisonic audio signal, generate a B-format encoding of the input ambisonic audio signal from the A-format encoding of the input ambisonic audio signal, wherein the B-format encoding of the input audio signal is a loudspeaker configuration independent encoding of the input ambisonic audio signal, and wherein the output audio signal comprises the B-format encoding of the input ambisonic audio signal; and
   transmit the output audio signal to the remote meeting equipment by transmitting the B-format encoding of the input ambisonic audio signal from the local meeting equipment to the remote meeting equipment.

14. The electronic system of claim 12, wherein the program code, when executed by the processing circuitry, further causes the processing circuitry to:
   after removing the remote audio signal from the A-format encoding of the input ambisonic audio signal, generate a B-format encoding of the input ambisonic audio signal from the A-format encoding of the input ambisonic audio signal, wherein the B-format encoding of the input audio signal is a loudspeaker configuration independent encoding of the input ambisonic audio signal;
   generate an output encoding of the input ambisonic audio signal from the B-format encoding of the input ambisonic audio signal, wherein the output audio signal comprises the output encoding of the input ambisonic audio signal; and
   transmit the output audio signal to the remote meeting equipment comprises by transmitting the output encoding of the input ambisonic audio signal to the remote meeting equipment.

15. The electronic system of claim 14, wherein the remote meeting equipment includes a virtual reality headset, and wherein the program code, when executed by the processing circuitry, further causes the processing circuitry to:
   receive, from the virtual reality headset in the remote meeting equipment, data describing movements of the virtual reality headset;
   generate the output encoding of the input ambisonic audio signal from the B-format encoding of the input ambisonic audio signal responsive to the data describing movements of the virtual reality headset; and
   wherein the output encoding of the input ambisonic audio signal provides three dimensional audio reflecting a current positional orientation of the virtual reality headset.

16. The electronic system of claim 12, wherein the program code, when executed by the processing circuitry, further causes the processing circuitry to:
   perform automatic gain control on the input ambisonic audio signal by i) monitoring a maximum energy detected on each one of the channels in the input ambisonic audio signal, ii) determining a single adaptive gain level based on the maximum energy detected on each one of the channels in the input ambisonic audio signal, and iii) applying the single adaptive gain level to each one of the channels in the input ambisonic audio signal.

17. An electronic system, comprising:
   processing circuitry; and
   memory communicably coupled to the processing circuitry, the memory storing program code for processing ambisonic audio to provide three dimensional audio during a bidirectional real-time communication session between local meeting equipment and remote meeting equipment, wherein the program code, when executed by the processing circuitry, causes the processing circuitry to:
   receive, during the bidirectional real-time communication session, an input ambisonic audio signal, the input ambisonic audio signal including a plurality of channels, wherein each channel in the input ambisonic audio signal is made up of audio data representing sound captured by an ambisonic microphone located in the local meeting equipment;
   receive a remote audio signal, wherein the remote audio signal is made up of audio data representing sound captured by a microphone contained in remote meeting equipment, and wherein the remote audio signal is passed to at least one local loudspeaker located in the local meeting equipment for output by the local loudspeaker as sound;
   in response to the input ambisonic audio signal and the remote audio signal, generate an output audio signal by performing acoustic echo cancellation on the input ambisonic audio signal, wherein performing the acoustic echo cancellation removes the remote audio signal from the input ambisonic audio signal;
   wherein the acoustic echo cancellation is performed on the input ambisonic audio signal at least in part by introducing comfort noise into the input ambisonic audio signal;
   wherein the comfort noise is introduced into the input ambisonic audio signal at least in part by estimating spatial and spectral characteristics of noise in the input ambisonic audio signal and generating comfort noise that matches the spatial and spectral characteristics of the noise in the input ambisonic audio signal;
   generate an A-format encoding of the input ambisonic audio signal, wherein the A-format encoding of the input ambisonic audio signal comprises a pulse-code modulation encoding of the audio data in each channel of the input ambisonic audio signal;
   generate a B-format encoding of the input ambisonic audio signal from the A-format encoding of the input ambisonic audio signal, wherein the B-format encoding of the input audio signal is a loudspeaker configuration independent encoding of the input ambisonic audio signal;
   wherein the acoustic echo cancellation is performed on the input ambisonic audio signal at least in part by removing the remote audio signal from the B-format encoding of the input ambisonic audio signal; and
   transmit the output audio signal from the local meeting equipment to the remote meeting equipment for playback through at least two loudspeakers in the remote meeting equipment during the bidirectional real-time communication session.

18. The electronic system of claim 17, wherein the output audio signal comprises the B-format encoding of the input ambisonic audio signal; and
   wherein the program code, when executed by the processing circuitry, further causes the processing circuitry to transmit the output audio signal to the remote meeting equipment by transmitting the B-format encoding of the input ambisonic audio signal to the remote meeting equipment.

19. The electronic system of claim 17, wherein the program code, when executed by the processing circuitry, further causes the processing circuitry to:
    after removing the remote audio signal from the B-format encoding of the input ambisonic audio signal, generate an output encoding of the input ambisonic audio signal from the B-format encoding of the input ambisonic audio signal;
    wherein the output audio signal comprises the output encoding of the input ambisonic audio signal; and
    wherein the output audio signal is transmitted to the remote meeting equipment at least in part by transmitting the output encoding of the input ambisonic audio signal to the remote meeting equipment.

20. An electronic system, comprising:
    processing circuitry; and
    memory communicably coupled to the processing circuitry, the memory storing program code for processing ambisonic audio to provide three dimensional audio during a bidirectional real-time communication session between local meeting equipment and remote meeting equipment, wherein the program code, when executed by the processing circuitry, causes the processing circuitry to:
        receive, during the bidirectional real-time communication session, an input ambisonic audio signal, the input ambisonic audio signal including a plurality of channels, wherein each channel in the input ambisonic audio signal is made up of audio data representing sound captured by an ambisonic microphone located in the local meeting equipment;
        receive a remote audio signal, wherein the remote audio signal is made up of audio data representing sound captured by a microphone contained in remote meeting equipment, and wherein the remote audio signal is passed to at least one local loudspeaker located in the local meeting equipment for output by the local loudspeaker as sound;
        in response to the input ambisonic audio signal and the remote audio signal, generate an output audio signal by performing acoustic echo cancellation on the input ambisonic audio signal, wherein performing the acoustic echo cancellation removes the remote audio signal from the input ambisonic audio signal;
        wherein the acoustic echo cancellation is performed on the input ambisonic audio signal at least in part by introducing comfort noise into the input ambisonic audio signal;
        wherein the comfort noise is introduced into the input ambisonic audio signal at least in part by estimating spatial and spectral characteristics of noise in the input ambisonic audio signal and generating comfort noise that matches the spatial and spectral characteristics of the noise in the input ambisonic audio signal;
        generate an A-format encoding of the input ambisonic audio signal, wherein the A-format encoding of the input ambisonic audio signal comprises a pulse-code modulation encoding of the audio data in each channel of the input ambisonic audio signal;
        generate a B-format encoding of the input ambisonic audio signal from the A-format encoding of the input ambisonic audio signal, wherein the B-format encoding of the input audio signal is a loudspeaker configuration independent encoding of the input ambisonic audio signal;
        generate an output encoding of the input ambisonic audio signal from the B-format encoding of the input ambisonic audio signal;
        wherein the acoustic echo cancellation is performed on the input ambisonic audio signal at least in part by removing the remote audio signal from the output encoding of the input ambisonic audio signal; and
        transmit the output audio signal from the local meeting equipment to the remote meeting equipment for playback through at least two loudspeakers in the remote meeting equipment during the bidirectional real-time communication session.

21. A computer program product, comprising:
    a non-transitory computer readable medium storing program code for processing ambisonic audio to provide three dimensional audio during a bidirectional real-time communication session between local meeting equipment and remote meeting equipment, the set of instructions, when carried out by at least one processor, causing the processor to perform a method of:
        receiving, during the bidirectional real-time communication session, an input ambisonic audio signal, the input ambisonic audio signal including a plurality of channels, wherein each channel in the input ambisonic audio signal is made up of audio data representing sound captured by an ambisonic microphone located in the local meeting equipment;
        receiving a remote audio signal, wherein the remote audio signal is made up of audio data representing sound captured by a microphone contained in remote meeting equipment, and wherein the remote audio signal is passed to at least one local loudspeaker located in the local meeting equipment for output by the local loudspeaker as sound;
        in response to the input ambisonic audio signal and the remote audio signal, generating an output audio signal by performing acoustic echo cancellation on the input ambisonic audio signal, wherein performing the acoustic echo cancellation removes the remote audio signal from the input ambisonic audio signal;
        wherein performing the acoustic echo cancellation on the input ambisonic audio signal includes introducing comfort noise into the input ambisonic audio signal;
        wherein introducing the comfort noise into the input ambisonic audio signal includes estimating spatial and spectral characteristics of noise in the input ambisonic audio signal and generating comfort noise that matches the spatial and spectral characteristics of the noise in the input ambisonic audio signal;
        generating an A-format encoding of the input ambisonic audio signal, wherein the A-format encoding of the input ambisonic audio signal comprises a pulse-code modulation encoding of the audio data in each channel of the input ambisonic audio signal;
        wherein performing the acoustic echo cancellation on the input ambisonic audio signal includes removing the remote audio signal from the A-format encoding of the input ambisonic audio signal; and
        transmitting the output audio signal from the local meeting equipment to the remote meeting equipment for playback through at least two loudspeakers in the remote meeting equipment during the bidirectional real-time communication session.

* * * * *